US010285106B2

(12) United States Patent
Han et al.

(10) Patent No.: US 10,285,106 B2
(45) Date of Patent: May 7, 2019

(54) USER EQUIPMENT AND METHOD FOR ENSURING CONTINUOUS SERVICE RECEPTION IN WIRELESS NETWORK

(71) Applicant: Huawei Technologies Co., Ltd., Shenzhen, Guangdong (CN)

(72) Inventors: Guanglin Han, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 245 days.

(21) Appl. No.: 15/244,491

(22) Filed: Aug. 23, 2016

(65) Prior Publication Data

US 2016/0360464 A1 Dec. 8, 2016

Related U.S. Application Data

(63) Continuation of application No. PCT/CN2014/072460, filed on Feb. 24, 2014.

(51) Int. Cl.
*H04W 24/10* (2009.01)
*H04W 36/00* (2009.01)
(Continued)

(52) U.S. Cl.
CPC .......... *H04W 36/30* (2013.01); *H04W 24/10* (2013.01); *H04W 36/0083* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS 9,544,794 B2 * 1/2017 Kim ...................... H04W 36/04
2009/0257398 A1 * 10/2009 Koyanagi ............. H04W 48/18
370/331

(Continued)

FOREIGN PATENT DOCUMENTS

CN 101370239 A 2/2009
CN 101583080 A 11/2009
CN 102137430 A 7/2011

OTHER PUBLICATIONS

Catt et al., "On UE measurements for TDD asymmetry scenario", 3GPP TSG RAN WG1 meeting #52, Feb. 11-15, 2008, 2 pages, R1-080801.

(Continued)

*Primary Examiner* — Marcus Smith
*Assistant Examiner* — Prenell P Jones

(57) ABSTRACT

The present invention provides user equipment and a method for ensuring continuous service reception in a wireless network. User equipment (UE) obtains configuration information of a neighboring cell; the UE determines that at least two cells of all cells including the serving cell and the neighboring cell belong to a same area to which a same multimedia broadcast multicast service belongs; and during measurement of a reference signal, the UE combines reference signal measurement values of at least two cells that belong to the area of the same multimedia broadcast multicast service to obtain a combined measurement value, and compares the combined measurement value with a measurement value of another cell, so as to determine whether to perform reselection. Therefore, in a handover determining process, radio signal quality of a single cell is prevented from being underestimated, so that an unnecessary handover procedure is avoided, thereby ensuring quality of a radio signal obtained by UE.

22 Claims, 3 Drawing Sheets

(51) Int. Cl.
*H04W 74/00* (2009.01)
*H04W 36/30* (2009.01)
*H04W 36/24* (2009.01)
*H04W 36/18* (2009.01)

(52) U.S. Cl.
CPC ..... *H04W 36/00835* (2018.08); *H04W 36/18* (2013.01); *H04W 36/24* (2013.01); *H04W 36/0007* (2018.08); *H04W 36/0058* (2018.08); *H04W 36/0085* (2018.08)

(56) References Cited

U.S. PATENT DOCUMENTS

| | | |
|---|---|---|
| 2012/0014264 A1 | 1/2012 | Wang et al. |
| 2013/0301509 A1 | 11/2013 | Purnadi et al. |
| 2014/0016491 A1 | 1/2014 | Gholmieh et al. |
| 2014/0071919 A1* | 3/2014 | Kitazoe ............ H04W 72/1268 370/329 |
| 2015/0063304 A1* | 3/2015 | Koyanagi ............ H04W 48/18 370/331 |

OTHER PUBLICATIONS

Huawei, HiSilicon, "Discussion on UE measurements for MBMS", 3GPP TSG RAN WG1 Meeting #74bis, Oct. 7-11, 2013, 4 pages, R1-134351.

Huawei, HiSilicon, "Service continuity for group communication over eMBMS", 3GPP TSG-RAN WG2 #85, Feb. 10-14, 2014, 8 pages, R2-140261.

* cited by examiner

USER EQUIPMENT AND METHOD FOR ENSURING CONTINUOUS SERVICE RECEPTION IN WIRELESS NETWORK

CROSS-REFERENCE TO RELATED APPLICATIONS

This application is a continuation of International Application No. PCT/CN2014/072460, filed on Feb. 24, 2014, which is hereby incorporated by reference in its entirety.

TECHNICAL FIELD

The present invention relates to the field of wireless communications technologies, and in particular, to user equipment and a method for ensuring continuous service reception in a wireless network.

BACKGROUND

In an existing Long Term Evolution (LTE for short) wireless communications network, to determine radio signal quality at a location of user equipment (UE for short), the UE needs to perform reference signal measurement on a cell that serves the UE or a cell on which the UE camps, and in consideration of mobility of the UE, the UE also needs to perform measurement on a neighboring cell. These measurement values include a reference signal received power (RSRP for short), reference signal received quality (RSRQ for short), and the like. The RSRP and the RSRQ are relatively important measurement values among all measurement values. As an RSRP of a cell measured by the UE increases, strength of a signal received by the UE from the cell increases. As RSRQ of a cell measured by the UE increases, quality of a signal received by the UE from the cell increases. As the UE moves in a direction away from a cell A, an RSRP of the cell A that is measured and that is fed back by the UE gradually decreases. As the UE moves in a direction towards a cell B, an RSRP of the cell B that is measured and that is fed back by the UE gradually increases. That is, when the UE is moving, RRM measurement values are continuously measured and fed back. A base station then finds, by using the corresponding RRM measurement values, whether a cell that provides a service to the UE needs to be changed, or the like.

The UE generally performs data transmission in two manners. Manner 1: The UE performs data transmission by means of a single cell service. Manner 2: The UE performs data transmission by means of a multimedia broadcast multicast service (MBMS for short). In Manner 2, multiple cells send data to at least one UE by using a data transmission method of a single frequency network (SFN for short). Further, an LTE system is geographically divided into multiple cells, and a corresponding base station provides a service to each cell. An MBMS service is generally performed according to an MBMS area. Specifically, several cells (which are generally neighboring cells) in a network may form one MBMS area, and cells that belong to one area all send a broadcast multicast service that belongs to this area. For example, if a television program of CCTV1 is provided in one area, all cells in this area provide this program. Moreover, all cells in this area simultaneously send a signal of this program on a same time-frequency resource. In this way, strength of a transmitted signal of the MBMS can be increased, and particularly, received strength of a cell edge user is increased.

When UE moves between two base stations that belong to different MBMS areas or moves between a base station that belongs to an MBMS area and a base station that belongs to a non-MBMS area, to determine whether to perform a cell handover, in the prior art, the UE measures radio signal quality of a source base station and a target base station, and it is determined, based on obtained measurement values of radio signal quality, for example, an RSRP and RSRQ above, whether to perform a cell handover. However, when a manner of measuring radio signal quality of a source base station and a target base station in the prior art is used to determine whether to perform a cell handover, a premature handover is usually caused, which results in an unnecessary handover procedure, or a handover is performed too late, which results in a service interruption.

SUMMARY

Embodiments of the present invention provide user equipment and a method for ensuring continuous service reception in a wireless network, so as to avoid a misjudgment on an occasion for UE to perform cell reselection or for a base station to initiate a handover, thereby ensuring continuity of obtaining service data by the UE.

A first aspect of the present invention provides user equipment, including:

an obtaining unit, configured to obtain configuration information of at least one neighboring cell;

a determining unit, configured to determine, according to configuration information of a serving cell and the configuration information of the at least one neighboring cell, that at least two cells of all cells including the serving cell and the at least one neighboring cell belong to a same area to which a same multimedia broadcast multicast service belongs;

a combination unit, configured to: during measurement of a reference signal, combine reference signal measurement values of the at least two cells that belong to the same area to which the same multimedia broadcast multicast service belongs to, obtain a combined measurement value; or, combine reference signals of the at least two cells that belong to the same area to which the same multimedia broadcast multicast service belongs, and perform measurement to obtain a combined measurement value; and a handover unit, configured to determine, according to the combined measurement value, whether to perform cell reselection; or, configured to trigger sending of a measurement report to a base station, and send a measurement report message to the base station, where the measurement report message includes the combined measurement value, so that the base station determines, according to the combined measurement value, whether to perform a cell handover.

With reference to the first aspect, in a first feasible implementation manner, the obtaining unit is further configured to obtain unicast transmission indication information of a multimedia broadcast multicast service that the user equipment currently receives or prepares to receive;

the handover unit is specifically configured to: if the combined measurement value meets a cell handover condition and a target cell is a unicast transmission cell, determine, according to the unicast transmission indication information, whether the multimedia broadcast multicast service that the user equipment currently receives or prepares to receive supports unicast transmission; and if the multimedia broadcast multicast service that the user equipment currently receives or prepares to receive supports unicast transmission, the handover unit determines to perform a cell handover.

With reference to the first aspect or the first feasible implementation manner of the first aspect, in a second feasible implementation manner, the handover unit is specifically configured to compare the combined measurement value with a reference signal measurement value of at least one other cell, to determine whether to perform cell reselection; or the measurement report message further includes a reference signal measurement value of at least one other cell, so that the base station compares the combined measurement value with the reference signal measurement value of the at least one other cell, to determine whether to perform a cell handover, where the other cell is a cell, which does not belong to an area to which any multimedia broadcast multicast service belongs, of all the cells including the serving cell and the at least one neighboring cell.

With reference to the first aspect or any one of the feasible implementation manners of the first aspect, in a third feasible implementation manner, the obtaining unit is specifically configured to receive a broadcast multicast signal measurement configuration message, sent by a source base station, of the at least one neighboring cell, where the broadcast multicast signal measurement configuration message of the neighboring cell includes the configuration information of the neighboring cell; or the obtaining unit is specifically configured to read a broadcast sent by a source base station, where the broadcast includes the configuration information of the neighboring cell.

With reference to the third feasible implementation manner of the first aspect, in a fourth feasible implementation manner, the configuration information of the neighboring cell specifically includes an area identifier corresponding to an area to which a multimedia broadcast multicast service of the neighboring cell belongs and frequency information of the neighboring cell, where the frequency information of the neighboring cell includes a frequency of the neighboring cell and/or identifier information of a frequency layer.

With reference to the fourth feasible implementation manner of the first aspect, in a fifth feasible implementation manner, the configuration information of the neighboring cell further includes threshold configuration information and/or identifier information of the neighboring cell.

With reference to the first aspect or any one of the feasible implementation manners of the first aspect, in a sixth feasible implementation manner, the configuration information of the serving cell includes a first identifier and frequency information of the serving cell, where the first identifier is an area identifier corresponding to an area to which the multimedia broadcast multicast service that the user equipment currently receives or prepares to receive belongs, and the frequency information of the serving cell includes a frequency of the serving cell and/or identifier information of a frequency layer; and the determining unit is specifically configured to: if the first identifier is the same as the area identifier corresponding to the area to which the multimedia broadcast multicast service of the at least one neighboring cell belongs, and the frequency information of the serving cell is the same as the frequency information of the at least one neighboring cell, determine that the serving cell and the at least one neighboring cell belong to the same area to which the same multimedia broadcast multicast service belongs.

With reference to the sixth feasible implementation manner of the first aspect, in a seventh feasible implementation manner, the combination unit is specifically configured to: during measurement of a reference signal, if the at least one neighboring cell includes the multimedia broadcast multicast service that the user equipment currently receives or prepares to receive, combine a reference signal measurement value of the serving cell and a reference signal measurement value of the at least one neighboring cell to obtain the combined measurement value.

With reference to the first aspect or any feasible implementation manner of the first feasible implementation manner to the fifth feasible implementation manner of the first aspect, in an eighth feasible implementation manner, the determining unit is specifically configured to: if area identifiers corresponding to areas to which multimedia broadcast multicast services of the at least two neighboring cells belong are the same, and the at least two neighboring cells have the same frequency information, determine that the at least two neighboring cells belong to the same area to which the same multimedia broadcast multicast service belongs.

With reference to the eighth feasible implementation manner of the first aspect, in a ninth feasible implementation manner, the combination unit is specifically configured to: during measurement of a reference signal, if the at least two neighboring cells include the multimedia broadcast multicast service that the user equipment currently receives or prepares to receive, combine the reference signal measurement values of the at least two neighboring cells to obtain the combined measurement value.

With reference to any feasible implementation manner of the fourth feasible implementation manner to the ninth feasible implementation manner of the first aspect, in a tenth feasible implementation manner, the area identifier corresponding to the area to which the multimedia broadcast multicast service of the neighboring cell belongs is a single frequency network area identifier of the neighboring cell; and the first identifier is a single frequency network area identifier corresponding to the area to which the multimedia broadcast multicast service that the user equipment currently receives or prepares to receive belongs.

A second aspect of the present invention provides a method for ensuring continuous service reception in a wireless network, including:

obtaining, by user equipment UE, configuration information of at least one neighboring cell;

determining, by the UE according to configuration information of a serving cell and the configuration information of the at least one neighboring cell, that at least two cells of all cells including the serving cell and the at least one neighboring cell belong to a same area to which a same multimedia broadcast multicast service belongs;

during measurement of a reference signal, combining, by the UE, reference signal measurement values of the at least two cells that belong to the same area to which the same multimedia broadcast multicast service belongs to, obtain a combined measurement value; or, combining reference signals of the at least two cells that belong to the same area to which the same multimedia broadcast multicast service belongs, and performing measurement to obtain a combined measurement value; and deciding, by the UE according to the combined measurement value, whether to perform cell reselection; or, triggering sending of a measurement report to a base station, and sending a measurement report message to the base station, where the measurement report message includes the combined measurement value, so that the base station determines, according to the combined measurement value, whether to perform a cell handover.

With reference to the second aspect, in a second feasible implementation manner, the method further includes:

obtaining, by the UE, unicast transmission indication information of a multimedia broadcast multicast service that the UE currently receives or prepares to receive;

if the combined measurement value meets a cell handover condition and a target cell is a unicast transmission cell, determining, by the UE according to the unicast transmission indication information, whether the multimedia broadcast multicast service that the UE currently receives or prepares to receive supports unicast transmission; and if the multimedia broadcast multicast service that the UE currently receives or prepares to receive supports unicast transmission, deciding, by the UE, to perform a cell handover.

With reference to the second aspect or the first feasible implementation manner of the second aspect, in a second feasible implementation manner, the UE compares the combined measurement value with a reference signal measurement value of at least one other cell, to determine whether to perform cell reselection; or the measurement report message further includes a reference signal measurement value of at least one other cell, so that the base station compares the combined measurement value with the reference signal measurement value of the at least one other cell, to determine whether to perform a cell handover, where the other cell is a cell, which does not belong to an area to which any multimedia broadcast multicast service belongs, of all the cells including the serving cell and the at least one neighboring cell.

With reference to the second aspect or any one of the feasible implementation manners of the second aspect, in a third feasible implementation manner, the obtaining, by UE, configuration information of at least one neighboring cell includes:

receiving, by the UE, a broadcast multicast signal measurement configuration message, sent by a source base station, of the at least one neighboring cell, where the broadcast multicast signal measurement configuration message of the neighboring cell includes the configuration information of the neighboring cell; or the UE is configured to read a broadcast sent by a source base station, where the broadcast includes the configuration information of the neighboring cell.

With reference to the third feasible implementation manner of the second aspect, in a fourth feasible implementation manner, the configuration information of the neighboring cell specifically includes an area identifier corresponding to an area to which a multimedia broadcast multicast service of the neighboring cell belongs and frequency information of the neighboring cell, where the frequency information of the neighboring cell includes a frequency of the neighboring cell and/or identifier information of a frequency layer.

With reference to the fourth feasible implementation manner of the second aspect, in a fifth feasible implementation manner, the configuration information of the neighboring cell further includes threshold configuration information and/or identifier information of the neighboring cell.

With reference to the second aspect or any one of the feasible implementation manners of the second aspect, in a sixth feasible implementation manner, the configuration information of the serving cell includes a first identifier and frequency information of the serving cell, where the first identifier is an area identifier corresponding to an area to which the multimedia broadcast multicast service that the user equipment currently receives or prepares to receive belongs, and the frequency information of the serving cell includes a frequency of the serving cell and/or identifier information of a frequency layer;

the determining, by the UE according to configuration information of a serving cell and the configuration information of the at least one neighboring cell, that at least two cells of all cells including the serving cell and the at least one neighboring cell belong to a same area to which a same multimedia broadcast multicast service belongs includes:

if the first identifier is the same as the area identifier corresponding to the area to which the multimedia broadcast multicast service of the at least one neighboring cell belongs, and the frequency information of the serving cell is the same as the frequency information of the at least one neighboring cell, determining, by the UE, that the serving cell and the at least one neighboring cell belong to the same area to which the same multimedia broadcast multicast service belongs.

With reference to the sixth feasible implementation manner of the second aspect, in a seventh feasible implementation manner, the during measurement of a reference signal combining, by the UE, reference signal measurement values of the at least two cells that belong to the same area to which the same multimedia broadcast multicast service belongs to, obtain a combined measurement value includes:

during measurement of a reference signal, if the at least one neighboring cell includes the multimedia broadcast multicast service that the user equipment currently receives or prepares to receive, combining, by the UE, a reference signal measurement value of the serving cell and a reference signal measurement value of the at least one neighboring cell to obtain the combined measurement value.

With reference to the second aspect or any feasible implementation manner of the first feasible implementation manner to the fifth feasible implementation manner of the second aspect, in an eighth feasible implementation manner, the determining, by the UE according to configuration information of a serving cell and the configuration information of the at least one neighboring cell, that at least two cells of all cells including the serving cell and the at least one neighboring cell belong to a same area to which a same multimedia broadcast multicast service belongs includes:

if area identifiers corresponding to areas to which multimedia broadcast multicast services of the at least two neighboring cells belong are the same, and the at least two neighboring cells have the same frequency information, determining, by the UE, that the at least two neighboring cells belong to the same area to which the same multimedia broadcast multicast service belongs.

With reference to the eighth feasible implementation manner of the second aspect, in a ninth feasible implementation manner, the during measurement of a reference signal combining, by the UE, reference signal measurement values of the at least two cells that belong to the same area to which the same multimedia broadcast multicast service belongs to, obtain a combined measurement value includes:

during measurement of a reference signal, if the at least two neighboring cells include the multimedia broadcast multicast service that the user equipment currently receives or prepares to receive, combining, by the UE, the reference signal measurement values of the at least two neighboring cells to obtain the combined measurement value.

With reference to any feasible implementation manner of the fourth feasible implementation manner to the ninth feasible implementation manner of the second aspect, in a tenth feasible implementation manner, the area identifier corresponding to the area to which the multimedia broadcast multicast service of the neighboring cell belongs is a single frequency network area identifier of the neighboring cell; and the first identifier is a single frequency network area identifier corresponding to the area to which the multimedia broadcast multicast service that the user equipment currently receives or prepares to receive belongs.

A third aspect of the present invention provides user equipment, including:

a radio frequency circuit, configured to obtain configuration information of at least one neighboring cell; and a processor, configured to determine, according to configuration information of a serving cell and the configuration information of the at least one neighboring cell, that at least two cells of all cells including the serving cell and the at least one neighboring cell belong to a same area to which a same multimedia broadcast multicast service belongs; and further configured to: during measurement of a reference signal, combine reference signal measurement values of the at least two cells that belong to the same area to which the same multimedia broadcast multicast service belongs to, obtain a combined measurement value; or, combine reference signals of the at least two cells that belong to the same area to which the same multimedia broadcast multicast service belongs, and perform measurement to obtain a combined measurement value, where the processor is further configured to determine, according to the combined measurement value, whether to perform cell reselection; or, configured to trigger sending of a measurement report to a base station, and send a measurement report message to the base station, where the measurement report message includes the combined measurement value, so that the base station determines, according to the combined measurement value, whether to perform a cell handover.

With reference to the third aspect, in a first feasible implementation manner, the radio frequency circuit is further configured to obtain unicast transmission indication information of a multimedia broadcast multicast service that the user equipment currently receives or prepares to receive;

the processor is specifically configured to: if the combined measurement value meets a cell handover condition and a target cell is a unicast transmission cell, determine, according to the unicast transmission indication information, whether the multimedia broadcast multicast service that the user equipment currently receives or prepares to receive supports unicast transmission; and if the multimedia broadcast multicast service that the user equipment currently receives or prepares to receive supports unicast transmission, the processor determines to perform a cell handover.

With reference to the third aspect or the first feasible implementation manner of the third aspect, in a second feasible implementation manner, the processor is specifically configured to compare the combined measurement value with a reference signal measurement value of at least one other cell, to determine whether to perform cell reselection; or the measurement report message further includes a reference signal measurement value of at least one other cell, so that the base station compares the combined measurement value with the reference signal measurement value of the at least one other cell, to determine whether to perform a cell handover, where the other cell is a cell, which does not belong to an area to which any multimedia broadcast multicast service belongs, of all the cells including the serving cell and the at least one neighboring cell.

With reference to the third aspect or any one of the feasible implementation manners of the third aspect, in a third feasible implementation manner, the radio frequency circuit is specifically configured to receive a broadcast multicast signal measurement configuration message, sent by a source base station, of the at least one neighboring cell, where the broadcast multicast signal measurement configuration message of the neighboring cell includes the configuration information of the neighboring cell; or the radio frequency circuit is specifically configured to read a broadcast sent by a source base station, where the broadcast includes the configuration information of the neighboring cell.

With reference to the third feasible implementation manner of the third aspect, in a fourth feasible implementation manner, the configuration information of the neighboring cell specifically includes an area identifier corresponding to an area to which a multimedia broadcast multicast service of the neighboring cell belongs and frequency information of the neighboring cell, where the frequency information of the neighboring cell includes a frequency of the neighboring cell and/or identifier information of a frequency layer.

With reference to the fourth feasible implementation manner of the third aspect, in a fifth feasible implementation manner, the configuration information of the neighboring cell further includes threshold configuration information and/or identifier information of the neighboring cell.

With reference to the third aspect or any one of the feasible implementation manners of the third aspect, in a sixth feasible implementation manner, the configuration information of the serving cell includes a first identifier and frequency information of the serving cell, where the first identifier is an area identifier corresponding to an area to which the multimedia broadcast multicast service that the user equipment currently receives or prepares to receive belongs, and the frequency information of the serving cell includes a frequency of the serving cell and/or identifier information of a frequency layer;

the processor is specifically configured to: if the first identifier is the same as the area identifier corresponding to the area to which the multimedia broadcast multicast service of the at least one neighboring cell belongs, and the frequency information of the serving cell is the same as the frequency information of the at least one neighboring cell, determine that the serving cell and the at least one neighboring cell belong to the same area to which the same multimedia broadcast multicast service belongs.

With reference to the sixth feasible implementation manner of the third aspect, in a seventh feasible implementation manner, the processor is specifically configured to: during measurement of a reference signal, if the at least one neighboring cell includes the multimedia broadcast multicast service that the user equipment currently receives or prepares to receive, combine a reference signal measurement value of the serving cell and a reference signal measurement value of the at least one neighboring cell to obtain the combined measurement value.

With reference to the third aspect or any feasible implementation manner of the first feasible implementation manner to the fifth feasible implementation manner of the third aspect, in an eighth feasible implementation manner, the processor is specifically configured to: if area identifiers corresponding to areas to which multimedia broadcast multicast services of the at least two neighboring cells belong are the same, and the at least two neighboring cells have the same frequency information, determine that the at least two neighboring cells belong to the same area to which the same multimedia broadcast multicast service belongs.

With reference to the eighth feasible implementation manner of the third aspect, in a ninth feasible implementation manner, the processor is specifically configured to: during measurement of a reference signal, if the at least two neighboring cells include the multimedia broadcast multicast service that the user equipment currently receives or prepares to receive, combine the reference signal measurement values of the at least two neighboring cells to obtain the combined measurement value.

With reference to any feasible implementation manner of the fourth feasible implementation manner to the ninth feasible implementation manner of the third aspect, in a tenth feasible implementation manner, the area identifier corresponding to the area to which the multimedia broadcast multicast service of the neighboring cell belongs is a single frequency network area identifier of the neighboring cell; and the first identifier is a single frequency network area identifier corresponding to the area to which the multimedia broadcast multicast service that the user equipment currently receives or prepares to receive belongs.

According to the user equipment and the method for ensuring continuous service reception in a wireless network provided in the embodiments of the present invention, user equipment UE obtains configuration information of at least one neighboring cell; the UE determines, according to configuration information of a serving cell and the configuration information of the at least one neighboring cell, that at least two cells of all cells including the serving cell and the at least one neighboring cell belong to a same area to which a same multimedia broadcast multicast service belongs; and subsequently, during measurement of a reference signal, the UE combines reference signal measurement values of the at least two cells that belong to the same area to which the same multimedia broadcast multicast service belongs to, obtain a combined measurement value; or, combines reference signals of the at least two cells that belong to the same area to which the same multimedia broadcast multicast service belongs, and performs measurement to obtain a combined measurement value; and determines, according to the combined measurement value, whether to perform cell reselection; or, triggers sending of a measurement report to a base station, and sends a measurement report message to the base station, where the measurement report message includes the combined measurement value, so that the base station determines, according to the combined measurement value, whether to perform a cell handover. Therefore, in a subsequent handover determining process, UE or a base station of a serving cell considers overall signal strength of an MBMS area, and radio signal quality of a single cell is prevented from being underestimated, so that an unnecessary handover procedure is avoided, and handover occasions become more appropriate, thereby ensuring quality of a radio signal obtained by UE.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
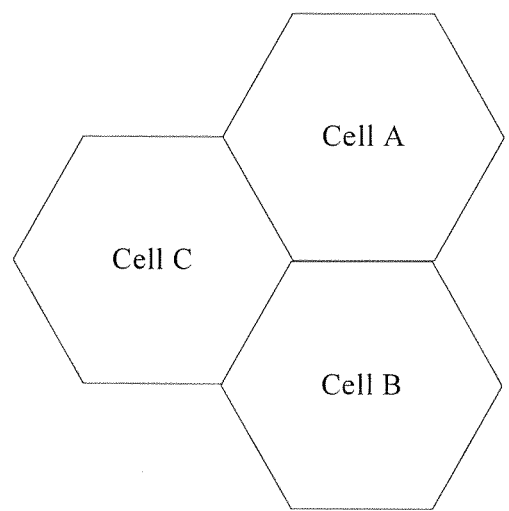
FIG. 1 is a schematic diagram of cell distribution.

FIG. 1 is a schematic diagram of cell distribution. As shown in FIG. 1, three cells: a cell A, a cell B, and a cell C are used as an example. In two scenarios: a scenario in which user equipment (UE for short) moves between two base stations that belong to different multimedia broadcast multicast service (MBMS for short) areas, and a scenario in which UE moves between a base station that belongs to an MBMS area and a base station that belongs to a non-MBMS area, problems that occur when the prior art is used to measure radio signal quality are described.

If the cell A and the cell B are two cells in a same MBMS area, and the cell C is a cell in a non-MBMS area, assuming that the user equipment UE moves from the cell B to the cell C, in this case, according to a radio signal quality measurement mechanism in the prior art, the UE needs to separately measure radio signal quality of the cell A, the cell B, and the cell C, and subsequently, the UE determines, according to the radio signal quality of the different cells, whether to perform cell reselection. Alternatively, the UE sends measurement results to a base station of a serving cell, and the base station determines whether to perform a cell handover. However, because the UE is at a boundary between the cell A and the cell B, radio signal quality, of the cell A, obtained through separate measurement is lower than radio signal quality of the cell C. Based on such a comparison result, the UE or the base station may choose to perform a handover to the cell C. However, it can be learned according to a characteristic of an MBMS area that cells in the same MBMS area all send a broadcast multicast service that belongs to this area, so that strength of a transmitted signal of the MBMS is increased, and particularly, received strength of a cell edge user is increased. Therefore, from the perspective of an MBMS area, if the UE moves to the cell A, as can be learned from a characteristic of the MBMS area, received strength of the UE is much higher than that after the UE is handed over to the cell C, and an unnecessary handover procedure is not caused. Obviously, according to the radio signal quality measurement mechanism in the prior art, when a difference in radio signal quality between two cells is considered separately, radio signal quality of the cell A is easily underestimated, and a misjudgment on a handover is caused, which results in an unnecessary handover procedure, or a handover is performed too late, which results in a service interruption. Further, in the foregoing scenario, after the UE is handed over to the cell C, the UE is interfered by both the cell A and the cell B, which reduces radio signal quality, in the cell C, of the UE.

If the cell A and the cell B are two cells in an MBMS area 1, and the cell C is a cell in an MBMS area 2, because different MBMS areas may have a same broadcast multicast service, to receive a same service, the UE may be handed from the cell B to the cell C, but a corresponding handover procedure also needs to be performed. According to the radio signal quality measurement mechanism in the prior art, a problem similar to the foregoing is also caused.

Therefore, for the foregoing problem, embodiments of the present invention provide user equipment and a method for measuring wireless network signal quality, so that wireless network signal quality can be measured from the perspective of a characteristic of an MBMS area, thereby avoiding an underestimate of or a misjudgment on measurement of quality of a network signal of a cell. Specific embodiments are used below to describe the method for measuring wireless network signal quality.

Figure 2:
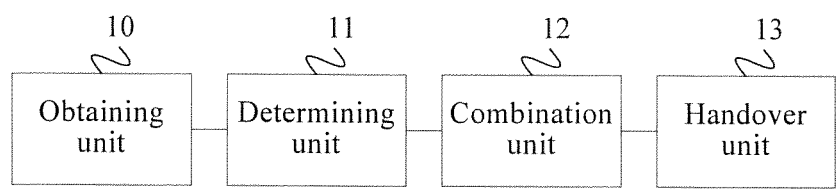
FIG. 2 is a schematic structural diagram of user equipment according to an embodiment of the present invention.

FIG. 2 is a schematic structural diagram of user equipment according to an embodiment of the present invention. As shown in FIG. 2, the user equipment, that is, the UE may include including a mobile phone, a tablet computer, a PDA (Personal Digital Assistant, personal digital assistant), a POS (Point of Sales, sales terminal), or a vehicle-mounted computer. The UE includes: an obtaining unit 10, a determining unit 11, a combination unit 12, and a handover unit 13.

The obtaining unit 10 is configured to obtain configuration information of at least one neighboring cell.

The determining unit 11 is configured to determine, according to configuration information of a serving cell and the configuration information of the at least one neighboring cell, that at least two cells of all cells including the serving cell and the at least one neighboring cell belong to an area of a same multimedia broadcast multicast service.

The combination unit 12 is configured to: during measurement of a reference signal, combine reference signal measurement values of the at least two cells that belong to the same area to which the same multimedia broadcast multicast service belongs to, obtain a combined measurement value.

Alternatively, the combination unit 12 may also obtain a combined measurement value in a manner of combining reference signals and then performing measurement.

The handover unit 13 is configured to determine, according to the combined measurement value, whether to perform cell reselection; or, trigger sending of a measurement report to a base station, and send a measurement report message to the base station, where the measurement report message includes the combined measurement value, so that the base station determines, according to combined measurement value, whether to perform a cell handover.

It should be noted that, after the UE obtains the combined measurement value, for UE in an unconnected state, the UE determines, according to the combined measurement value, to perform cell reselection; and for UE in a connected state, the UE triggers sending of a measurement report to a base station, so that a measurement result is sent to a base station of the serving cell, and the base station determines, according to the combined measurement value, whether to perform a cell handover.

Continue to refer to FIG. 1. Three cells: the cell A, the cell B, and the cell C are used as an example. This embodiment is described based on three scenarios as follows: a scenario in which a serving cell and at least one neighboring cell belong to an MBMS area area 1, and at least one neighboring cell belongs to another MBMS area area 2; a scenario in which a serving cell does not belong to any MBMS area, and at least two neighboring cells belong to an MBMS area area 3; and a scenario in which a serving cell and at least one neighboring cell belong to an MBMS area area 1, and at least one neighboring cell does not belong to any MBMS area.

In Scenario 1: If the cell A and the cell B are two cells that belong to the area 1, and the cell C is a cell that belongs to the area 2, where the cell A is a current serving cell (or a camping cell) of the UE, because different MBMS areas may have a same multimedia broadcast multicast service, when the UE learns that a multimedia broadcast multicast service (that is, a multimedia broadcast multicast service that the UE is interested in) that the UE currently receives or prepares to receive and that is in the area 1 is also being sent in the neighboring area area 2, the combination unit 12 of the UE combines a reference signal measurement value of the cell A in the area 1 and a reference signal measurement value of the cell B in the area 1 to obtain a combined measurement value a, that is, a signal quality measurement value of the area 1, and subsequently the handover unit 13 determines, according to the combined measurement value a, whether to perform cell reselection. The process may also be referred to as area reselection, that is, the UE reselects from receiving a service in a cell in the area 1 to receiving a service in a cell in the area 2. Alternatively, the handover unit 13 sends a measurement report message to the base station, where the report includes a combined measurement value a, so that the base station determines, according to the combined measurement value a, whether to perform a cell handover. If the base station determines to perform a cell handover, the base station sends a cell handover command to the UE. The process may also be referred to as an area handover, that is, the UE is handed over from receiving a service in a cell in the area 1 to receiving a service in a cell in the area 2. If the base station determines to perform, an area handover, the base station sends an area handover command to the UE, where the message includes at least identifier information of a target area to which the UE is handed over, for example, an identifier of an area and a frequency identifier of an area. Specifically, a feasible implementation manner is: The UE determines, according to a preconfigured threshold, whether to initiate cell reselection, area reselection, a cell handover or an area handover. The preconfigured threshold may be notified by the base station to the UE by using a dedicated message, or may be broadcast to the UE by using a broadcast message, or may be a configuration threshold implemented in the UE. When the combined measurement value a reaches the preconfigured threshold, the handover unit 13 determines, according to the combined measurement value a, not to perform cell reselection, or not to perform area reselection. For example, when the combined measurement value a rises to or exceeds the preconfigured threshold, it indicates that in this case, wireless network signal quality of the area 1 meets a requirement for receiving a service by the UE, and the UE still receives or prepares to receive the multimedia broadcast multicast service by using the area 1, instead of selecting the cell C or a cell D in the area 2 as a cell for receiving or preparing to receive the service, or instead of selecting the area 2 as an area for receiving or preparing to receive the service. Alternatively, when the combined measurement value a reaches the preconfigured threshold, the handover unit 13 is triggered to send the foregoing measurement report message to the base station. Another feasible implementation manner is: When the combined measurement value a is less than or drops to the preconfigured threshold, the handover unit 13 determines, according to the combined measurement value a, to perform cell reselection, or to perform area reselection. Alternatively, when the combined measurement value a is less than or drops to the preconfigured threshold, the handover unit 13 is triggered to send the foregoing measurement report message to the base station. How the UE configures a threshold is described in detail below.

Further, if the area 2 further includes the cell D in addition to the cell C, and the cell C and the cell D that belong to the area 2 both have a multimedia broadcast multicast service (that is, a multimedia broadcast multicast service that the UE is interested in) that the UE currently receives or prepares to receive, the combination unit 12 of the UE combines a reference signal measurement value of the cell C in the area 2 and a reference signal measurement value of the cell D in the area 2 to obtain a combined measurement value b. In this case, the UE obtains both the combined measurement value a of the area 1 and the combined measurement value b of the area 2, and the handover unit 13 determines, according to the combined measurement value a and the combined measurement value b, whether to perform cell reselection or area reselection. Alternatively, the handover unit 13 determines, according to the combined measurement value a and the combined measurement value b, whether to trigger a measurement report message. If the handover unit 13 determines to trigger a measurement report message, the handover unit 13 sends a measurement report message to the base station, where the measurement report message includes the combined measurement value a and the combined measurement value b, so that the base station determines, according to the combined measurement value a and the combined measurement value b, whether to perform a cell handover. If the base station determines to perform a cell handover, the base station sends a cell handover command to the UE. The process may also be referred to as an area handover, that is, the UE is handed over from receiving a service in a cell in the area 1 to receiving a service in a cell in the area 2. If the base station determines to perform an area handover, the base station sends an area handover command to the UE, where the message includes at least identifier information of a target area to which the UE is handed over, for example, an identifier of an area and a frequency identifier of an area. Specifically, a feasible implementation manner is: The handover unit 13 compares the combined measurement value a with the combined measurement value b. Further, the UE may directly compare the combined measurement value a with the combined measurement value b, or, may compare a difference between the combined measurement value a and the combined measurement value b with a preset threshold, for example, to find whether the difference between the combined measurement values a and b reaches or exceeds the preset threshold. If the combined measurement value a is better than the combined measurement value b, because the current serving cell of the UE is the cell A, the UE still receives or prepares to receive a multimedia broadcast multicast service by using the area 1, instead of selecting the cell C or the cell D in the area 2. If the combined measurement value b is better than the combined measurement value a, the area 2 is selected to receive or prepare to receive a multimedia broadcast multicast service, and specifically, the UE selects the cell C or the cell D in the area 2 as a serving cell. Another feasible implementation manner is: The handover unit 13 sends a measurement report message to the base station, where the measurement report message includes the combined measurement value a and the combined measurement value b, and the base station compares the combined measurement value a with the combined measurement value b. Specifically, the UE may directly compare the combined measurement value a with the combined measurement value b, or, may compare a difference between the combined measurement value a and the combined measurement value b with a preset threshold. If the combined measurement value a is better than the combined measurement value b, because the current serving cell of the UE is the cell A, the base station instructs the UE not to perform a handover, and instructs the UE to still receive or prepare to receive a multimedia broadcast multicast service by using the area 1, instead of being handed over to the cell C or the cell D in the area 2. If the combined measurement value b is better than the combined measurement value a, the base station instructs the UE to be handed over to the area 2 to receive or prepare to receive a multimedia broadcast multicast service. Specifically, the base station instructs the UE to be handed over to the cell C or the cell D in the area 2.

It should be noted that, for Scenario 1, the UE or the base station of the serving cell needs to learn in advance that two MBMS areas have a multimedia broadcast multicast service that the UE currently receives or prepares to receive. If in an MBMS area, there is no multimedia broadcast multicast service that the UE currently receives or prepares to receive, the UE cannot select the MBMS area to receive a multimedia broadcast multicast service, that is, during measurement for area selection, only an area including a multimedia broadcast multicast service that the UE currently receives or prepares to receive is considered, or only a measurement result, of an area including a multimedia broadcast multicast service that the UE currently receives or prepares to receive, in a measurement report message is considered. For a measurement result of an area not including a multimedia broadcast multicast service that the UE currently receives or prepares to receive, the base station cannot instruct the UE to be handed over to the MBMS area; otherwise, the service is interrupted. However, when the UE is handed over from one cell in the MBMS area to a unicast cell, there is no such limitation. There is no such limitation because a unicast service is a dedicated transmission resource established for the UE.

Scenario 2: The cell A does not belong to any MBMS area (for example, the cell A is a unicast cell), and the cell B and the cell C are two cells in the area 3, where the cell A is a current serving cell (or camping cell) of the UE. When a multimedia broadcast multicast service (that is, a multimedia broadcast multicast service that the UE is interested in) that the UE currently receives or prepares to receive and that is in the cell A is also being sent in the neighboring cell area 3, the combination unit 12 of the UE combines a reference signal measurement value of the cell B in the area 3 and a reference signal measurement value of the cell C in the area 3 to obtain a combined measurement value c, that is, a signal quality measurement value of the area 3. Subsequently, the handover unit 13 determines, according to the combined measurement value c, whether to perform cell reselection or area reselection. Alternatively, the handover unit 13 determines, according to the combined measurement value c, whether to trigger a measurement report, and sends a measurement report message to the base station, where the measurement report message includes the combined measurement value c, so that the base station determines, according to the combined measurement value c, whether to perform a cell handover. Specifically, a feasible implementation manner is: The UE determines, according to a preconfigured threshold, whether to initiate cell reselection, area reselection, a cell handover, or an area handover, where the preconfigured threshold may be notified by the base station to the UE by using a dedicated message, or may be broadcast to the UE by using a broadcast message, or may be a configuration threshold implemented in the UE. When the combined measurement value c reaches the preconfigured threshold, the handover unit 13 determines, according to the combined measurement value c, whether to perform cell reselection or area reselection. For example, when the combined measurement value c reaches the preconfigured threshold, it indicates that in this case, wireless network signal quality of the area 3 meets a requirement for receiving broadcast multicast service data by the UE, and the UE chooses to use the area 3 to receive or prepare to receive a multimedia broadcast multicast service. Alternatively, the handover unit 13 triggers a measurement report and sends the foregoing measurement report message to the base station. Another feasible implementation manner is: When the combined measurement value c is less than/or drops to the preconfigured threshold, the handover unit 13 determines, according to the combined measurement value c, whether to perform cell reselection or area reselection. Alternatively, when the combined measurement value c is less than/or drops to the preconfigured threshold, the handover unit 13 triggers sending of the foregoing measurement report to the base station.

Scenario 3: The cell A and the cell B are two cells that belong to the area 1, the cell C does not belong to any MBMS area (for example, the cell C is a unicast cell), the UE is receiving or prepares to receive a service x broadcast in the area 1, and the UE determines that transmission of the broadcast multicast service x is supported in the cell C. Therefore, the combination unit 12 of the UE combines a reference signal measurement value of the cell A that belongs to the area 1 and a reference signal measurement value of the cell B that belongs to the area 1 to obtain a combined measurement value a, that is, a signal quality measurement value of the area 1. Subsequently, the handover unit 13 determines, according to the combined measurement value a, whether to perform cell reselection. Alternatively, the handover unit 13 determines whether to trigger a measurement report. If the handover unit 13 determines to send a measurement report message to the base station, the measurement report message includes the combined measurement value a, so that the base station determines, according to the combined measurement value a, whether to perform a cell handover. Specifically, a feasible implementation manner is: The UE compares, according to a preconfigured threshold, the combined measurement value a with the preconfigured threshold. The handover unit 13 determines, according to a result of comparing the combined measurement value a with the preconfigured threshold, whether to perform cell reselection or area reselection. For example, when the combined measurement value a reaches or exceeds the preconfigured threshold, it indicates that in this case, wireless network signal quality of the area 1 meets a requirement of the UE, and the UE still receives or prepares to receive a multimedia broadcast multicast service by using the area 3, and does not need to select the cell C as a serving cell. Alternatively, when the combined measurement value a reaches the preconfigured threshold, the handover unit 13 is triggered to send the foregoing measurement report message to the base station. Another feasible implementation manner is: When the combined measurement value a is less than or drops to the preconfigured threshold, the handover unit 13 determines, according to the combined measurement value a, whether to perform cell reselection. Alternatively, when the combined measurement value a is less than or drops to the preconfigured threshold, the handover unit 13 is triggered to send the foregoing measurement report message to the base station.

Further, for Scenario 2 and Scenario 3, another feasible implementation manner is: The UE compares a combined measurement value of areas to which a same multimedia broadcast multicast service belongs with a reference signal measurement value of another cell that does not belong to an area to which any multimedia broadcast multicast service belongs, to determine whether to perform cell reselection, or to perform area reselection. Alternatively, the UE sends a measurement report message that includes a combined measurement value and a reference signal measurement value to the base station, and the base station compares the combined measurement value with a reference signal measurement value of another cell, to determine whether to perform a cell handover. The implementation manner is described in detail below.

For Scenario 1, Scenario 2, and Scenario 3, before the UE measures area signal quality, the base station may send an area measurement configuration message to the UE by using a dedicated message or a system broadcast, where the measurement configuration message includes any one of or any combination of the following parameters: identifier information of an area to be measured; and a signal quality type, for example, a reference signal received power (RSRP for short) and/or reference signal received quality (RSRQ for short), of an area to be measured.

Further, the measurement configuration message may further include: frequency channel number information of an area to be measured; identifier information of a cell corresponding to an area to be measured; identifier information that needs to be deleted and that is of an area to be measured; and identifier information that needs to be updated and that is of an area to be measured.

It should be noted that for an MBMS area involved in each embodiment of the present invention, a smallest unit of the MBMS area is a cell, that is, one MBMS area includes at least one cell. Additionally, in this embodiment, three cells are used for description. A quantity of neighboring cells whose configuration information is obtained by the UE during movement is determined according to an actual cell distribution scenario, and is not limited in this embodiment, as long as it is determined that multiple cells belong to a same MBMS area. Reference signal measurement values of all cells that belong to a same MBMS area are combined, and then, according to a combined measurement value of different MBMS areas or according to a combined measurement value of MBMS areas and a reference signal measurement value of a cell in a non-MBMS area, the UE determines whether to perform cell reselection, or the base station determines whether to perform a cell handover.

According to the user equipment provided in this embodiment, the obtaining unit obtains configuration information of at least one neighboring cell; the determining unit determines, according to configuration information of a serving cell and the configuration information of the at least one neighboring cell, that at least two cells of all cells including the serving cell and the at least one neighboring cell belong to a same area to which a same multimedia broadcast multicast service belongs; subsequently, during measurement of a reference signal, the combination unit combines reference signal measurement values of the at least two cells that belong to the same area to which the same multimedia broadcast multicast service belongs to, obtain a combined measurement value; or, combines reference signals of the at least two cells that belong to the same area to which the same multimedia broadcast multicast service belongs, and performs measurement to obtain a combined measurement value; and the handover unit determines, according to the combined measurement value, whether to perform cell reselection; or, triggers sending of a measurement report to a base station, and sends a measurement report message to the base station, where the measurement report message includes the combined measurement value, so that the base station determines, according to the combined measurement value, whether to perform a cell handover. Therefore, in a subsequent handover determining process, UE or a base station of a serving cell considers overall signal strength of an MBMS area, and radio signal quality of a single cell is prevented from being underestimated, so that an unnecessary handover procedure is avoided, and handover occasions become more appropriate, thereby ensuring quality of a radio signal obtained by UE.

It should be noted that, in an LTE wireless communications network, to determine radio signal quality of a location of the UE, the UE needs to measure a reference signal of a serving cell or a camping cell of the UE. In consideration of mobility of the UE, the UE also needs to perform measurement on neighboring cells. These measurement quantities include a reference signal received power (RSRP for short), reference signal received quality (RSRQ for short), and the like. The RSRP and the RSRQ are relatively important measurement quantities among all measurement quantities.

The RSRP is a reference signal received power, and is defined as a linear average value of received powers of corresponding cell-specific reference signals (CRS for short) on corresponding resource elements (RE for short) that carry all CRS ports for measuring an RSRP within a measurement bandwidth. For measurement of an RSRP, the UE needs to use a CRS port 0 to perform measurement. When the UE can reliably detect a CRS port 1, while using the CRS port 0, the UE may use both the port 1 and the port 0 to determine an RSRP. The RSRQ is N×RSRP/(E-UTRA carrier RSSI), where N is a quantity of resource blocks (RB for short) of a measurement bandwidth for measuring an E-UTRA network carrier received signal strength indicator in an E-UTRA system, and the numerator the denominator need to correspond to a same quantity of resources. The E-UTRA carrier RSSI is a linear average value of a total received power that is measured on N RBs within a specified measurement bandwidth and that is on OFDM symbols that carry a CRS reference signal antenna port 0, and includes co-channel interference of a serving cell, interference caused by a non-serving cell, adjacent-channel interference, thermal noise, and the like. If upper layer signaling indicates a specific subframe for measuring RSRQ, the RSSI is measured on all OFDM symbols of the corresponding subframe.

When an RSRP, measured by the UE, of a cell is larger, a signal received by the UE from the cell is stronger. When RSRQ, measured by the UE, of a cell is larger, quality of a signal received by the UE from the cell is higher.

When the UE performs measurement (measurement of an RSRP, RSRQ, and an RSSI) of RRM radio resource management, the UE performs measurement multiple times within a measurement bandwidth and within a time range and then calculates a linear average value to obtain a corresponding RRM measurement value. For example, RSRP measurement values are measured 5 times within 200 ms and a linear average value is then calculated, to obtain a corresponding RSRP measurement value.

The RRM measurement value is mainly used for mobility management and the like of the UE. For example, an RSRP represents an average received power of reference signals from a cell to the UE. When the UE moves in a direction away from the cell B, an RSRP, measured and fed back by the UE, of the cell B gradually decreases. When the UE moves in a direction approaching the cell A, an RSRP, measured and fed back by the UE, of the cell A gradually increases. That is, during movement, the UE keeps measuring and feeding back each RRM measurement value, and then the base station finds, by using the corresponding RRM measurement value, whether the cell that provides a service to the UE needs to be changed, and the like.

Further, after the UE determines to perform cell reselection or the base station instructs the UE to perform a cell handover, if a target cell is a unicast transmission cell, the UE needs to learn whether a multimedia broadcast multicast service that the UE currently receives or prepares to receive supports unicast transmission. Therefore, further, the obtaining unit 10 is further configured to obtain unicast transmission indication information of a multimedia broadcast multicast service that the UE currently receives or prepares to receive. The unicast transmission indication information is used to indicate whether the service supports unicast transmission indication information. If the unicast transmission indication information indicates that the service supports unicast transmission, when the foregoing measurement result meets a cell reselection condition, the handover unit 13 determines to perform cell reselection.

Alternatively, the foregoing unicast transmission indication information of a multimedia broadcast multicast service that the UE currently receives or prepares to receive may also be obtained by the base station. After the base station receives a measurement report message sent by the UE, if it is determined according to a measurement result included in the measurement report message that a cell handover condition is met and a target cell is a unicast transmission cell, in this case, the base station determines, according to unicast transmission indication information of the service, whether the service supports unicast transmission. If the unicast transmission indication information indicates that the service supports unicast transmission, the base station instructs the UE to perform a cell handover.

It should be noted that for the foregoing two cases, if the unicast transmission indication information indicates that the service does not support unicast transmission, the UE does not select the target cell as a serving cell, and the base station does not instruct the UE to be handed over to the target cell.

Further, in two scenarios: a scenario in which a serving cell does not belong to any MBMS area, and at least two neighboring cells belong to one MBMS area area 3, and a scenario in which a serving cell and at least one neighboring cell belong to one MBMS area area 1, and at least one neighboring cell does not belong to any MBMS area, in addition to the foregoing manner in which the UE determines, according to a combined measurement value, whether to perform cell reselection or the base station determines, according to a combined measurement value, whether to perform a cell handover, the following implementation manner may be further used:

The handover unit 13 is specifically configured to compare a combined measurement value with a reference signal measurement value of at least one other cell, to determine whether to perform cell reselection; or, the measurement report message sent by the handover unit 13 to the base station further includes, in addition to the combined measurement value, a reference signal measurement value of at least one other cell, so that the base station compares the combined measurement value with a reference signal measurement value of at least one other cell, to determine whether to perform a cell handover.

The other cell refers to a cell, which does not belong to an area to which any multimedia broadcast multicast service belongs, of all the cells including the serving cell and the at least one neighboring cell.

The solution of deciding, according to comparison of a combined measurement value with a reference signal measurement value, whether to perform cell reselection or whether to perform a cell handover is described below by still using Scenario 2 and Scenario 3 above:

Scenario 2: The cell A does not belong to any MBMS area (for example, the cell A is a unicast cell), and the cell C and the cell B are two cells in the area 3, where the cell A is a current serving cell of the UE. When the UE learns that the cell B and the cell C that belong to the area 3 have a multimedia broadcast multicast service (that is, a multimedia broadcast multicast service that the UE is interested in) that the UE currently receives or prepares to receive, the combination unit 12 of the UE combines a reference signal measurement value of the cell B in the area 3 and a reference signal measurement value of the cell C in the area 3 to obtain a combined measurement value c, and the UE obtains a reference signal measurement value of the cell A. Subsequently, the handover unit 13 determines, according to the combined measurement value c and the reference signal measurement value of the cell A, whether to perform cell reselection. Alternatively, the handover unit 13 sends a measurement report message to the base station, where the measurement report message includes the combined measurement value c and the reference signal measurement value of the cell A, so that the base station determines, according to the combined measurement value c and the reference signal measurement value of the cell A, whether to perform a cell handover. Specifically, a feasible implementation manner is: The UE compares the combined measurement value c with the reference signal measurement value of the cell A. Further, the UE may directly compares the combined measurement value c with the reference signal measurement value of the cell A, or, may compare a difference between the combined measurement value c and the reference signal measurement value of the cell A with a preset threshold. When the combined measurement value c is better than the reference signal measurement value of the cell A, it indicates that in this case, wireless network signal quality of the area 3 meets a requirement of the UE, and the UE chooses to use the area 3 to receive or prepare to receive a multimedia broadcast multicast service. If the reference signal measurement value of the cell A is better than the combined measurement value c, it indicates that in this case, wireless network signal quality of the cell A meets a requirement of the UE, and the UE still receives or prepares to receive a multimedia broadcast multicast service by using the cell A, instead of selecting the cell B or the cell C in the area 3 as a serving cell. Another feasible implementation manner is: The handover unit 13 sends a measurement report message including the combined measurement value c and the reference signal measurement value of the cell A to the base station, and the base station compares the combined measurement value c with the reference signal measurement value of the cell A, to determine whether to perform a cell handover. A specific comparison process of the base station is similar to that of the UE, and is not described in detail herein again. Finally, according to a comparison result, the base station instructs the UE to perform a cell handover, or instructs the UE not to perform a cell handover.

Scenario 3: The cell A and the cell B are two cells in the area 1, and the cell C does not belong to any MBMS area (for example, the cell C is a unicast cell), where the cell A is a current serving cell of the UE. When the UE learns that the cell A and the cell B that belong to the area 1 have a multimedia broadcast multicast service (that is, a multimedia broadcast multicast service that the UE is interested in) that the UE currently receives or prepares to receive, the combination unit 12 of the UE combines a reference signal measurement value of the cell A in the area 1 and a reference signal measurement value of the cell B in the area 1 to obtain a combined measurement value a, and the obtaining module 10 of the UE obtains a reference signal measurement value of the cell C. Subsequently, the handover unit 13 determines, according to the combined measurement value a and the reference signal measurement value of the cell C, whether to perform cell reselection. Alternatively, the handover unit 13 sends a measurement report message to the base station, where the measurement report message includes the combined measurement value a and the reference signal measurement value of the cell C, so that the base station determines, according to the combined measurement value a and the reference signal measurement value of the cell C, whether to perform a cell handover. Specifically, a feasible implementation manner is: The UE compares the combined measurement value a with the reference signal measurement value of the cell C, to determine whether to perform cell reselection. A comparison manner of the UE is similar to the comparison manner of the UE in Scenario 2, and is not described in detail herein again. Another feasible implementation manner is: The handover unit 13 sends a measurement report message including the combined measurement value a and the reference signal measurement value of the cell C to the base station. The base station compares the combined measurement value a with the reference signal measurement value of the cell C, to determine whether to perform a cell handover. A specific comparison process of the base station is similar to that of the UE, and is not described in detail herein again. Finally, according to a comparison result, the base station instructs the UE to perform a cell handover, or instructs the UE not to perform a cell handover.

It should be noted that, only a case having three cells is described in the foregoing three scenarios. When multiple MBMS areas include at least two cells, and each MBMS area has a multimedia broadcast multicast service (that is, a multimedia broadcast multicast service that the UE is interested in) that the UE currently receives or prepares to receive, reference signal measurement values in all the MBMS areas are combined respectively, to obtain a combined measurement value of each MBMS area. The UE compares the multiple combined measurement values, or compares the combined measurement values with a preconfigured threshold. A specific comparison manner of the UE is similar to the foregoing comparison manner, so that the UE determines whether to perform cell reselection; or, the UE is triggered to send a measurement report message to the base station, so that the base station determines whether to perform a cell handover.

Further, the obtaining unit 10 may obtain the configuration information in two feasible implementation manners:

Implementation Manner 1:

The obtaining unit 10 is specifically configured to receive a broadcast multicast signal measurement configuration message, sent by a source base station, of the at least one neighboring cell, where the broadcast multicast signal measurement configuration message of the neighboring cell includes the configuration information of the neighboring cell.

Implementation Manner 2:

The obtaining unit 10 is specifically configured to read a broadcast sent by a source base station, where the broadcast includes the configuration information of the neighboring cell.

For Implementation manner 1 and Implementation manner 2, the configuration information of the neighboring cell specifically includes an area identifier corresponding to an area to which a multimedia broadcast multicast service of the neighboring cell belongs and frequency information of the neighboring cell, where the frequency information of the neighboring cell includes a frequency of the neighboring cell and/or identifier information of a frequency layer.

It is learned according to the area identifier corresponding to the area to which the multimedia broadcast multicast service of the neighboring cell belongs and the frequency information of the neighboring cell that a frequency layer and/or a broadcast multicast area of a measurement target correspond/corresponds to one cell, and the UE only measures a broadcast multicast reference signal of the cell, and uses a reference signal measurement value of the cell as a reference signal measurement value of a broadcast multicast reference signal of a frequency layer and/or a broadcast multicast area of a target area. One piece of identifier information of a frequency layer may correspond to one or more pieces of broadcast multicast cell identifier information; and one broadcast multicast area may correspond to one or more pieces of broadcast multicast cell identifier information.

It is learned according to the area identifier corresponding to the area to which the multimedia broadcast multicast service of the neighboring cell belongs and the frequency information of the neighboring cell that a frequency layer and/or a broadcast multicast area of a measurement target correspond/corresponds to multiple cells, and the UE performs combined measurement on broadcast multicast reference signals of multiple cells corresponding to the frequency layer and/or the broadcast multicast area that belong/belongs to the target; or respectively performs separate measurement on broadcast multicast reference signals of multiple cells corresponding to the frequency layer and/or the broadcast multicast area that belong/belongs to the target, and combines measurement results to obtain a combined measurement value, where the combined measurement value is used as a measurement result of the broadcast multicast reference signals of the frequency layer and/or the broadcast multicast area of the target. The UE may also measure a neighboring cell to find cells/a cell included in the frequency layer and/or the broadcast multicast area that belong/belongs to the target to be measured.

Further, the configuration information of the neighboring cell further includes threshold configuration information and/or identifier information of the neighboring cell.

After obtaining a threshold configuration, the UE sets a corresponding threshold according to the threshold configuration, and after obtaining a combined measurement value corresponding to an area to which at least one multimedia broadcast multicast service belongs, compares the combined measurement value with a threshold that is preconfigured by the UE according to the threshold configuration information. A feasible implementation manner is: In a case of only one combined measurement value, the UE preconfigures a threshold, and when the combined measurement value reaches the preconfigured threshold, the handover unit 13 determines, according to the combined measurement value, whether to perform cell reselection. Alternatively, when the combined measurement value reaches the preconfigured threshold, the handover unit 13 sends the foregoing measurement report message to the base station. Another feasible implementation manner is: When the combined measurement value is less than or drops to the preconfigured threshold, the handover unit 13 determines, according to the combined measurement value, whether to perform cell reselection. Alternatively, when the combined measurement value is less than or drops to a preconfigured threshold, the handover unit 13 sends the foregoing measurement report message to the base station.

A function of identifier information of a neighboring cell is that when the UE learns that multiple neighboring cells belong to a same area to which a same multimedia broadcast multicast service belongs, the UE combines, according to identifier information of each neighboring cell, reference signal measurement values of all neighboring cells inside the area, to obtain a combined measurement value; or, when the UE learns that a current serving cell and at least one neighboring cell belong to a same area to which a same multimedia broadcast multicast service belongs, the UE combines, according to identifier information of the neighboring cell and identifier information of the serving cell, reference signal measurement values of the at least one neighboring cell and the serving cell, to obtain a combined measurement value.

Further, for a scenario in which the current serving cell of the UE and at least one neighboring cell belong to a same MBMS area, the determining unit 11 is specifically configured to: if a first identifier is the same as the area identifier corresponding to the area to which the multimedia broadcast multicast service of the at least one neighboring cell belongs, and frequency information of the serving cell is the same as the frequency information of the at least one neighboring cell, determine that the serving cell and the at least one neighboring cell belong to the same area to which the same multimedia broadcast multicast service belongs.

The configuration information of the serving cell includes the first identifier and the frequency information of the serving cell, where the first identifier is an area identifier corresponding to an area to which the multimedia broadcast multicast service that the user equipment currently receives or prepares to receive belongs, and the frequency information of the serving cell includes a frequency of the serving cell and/or identifier information of a frequency layer.

The combination unit 12 is specifically configured to: during measurement of a reference signal, if the at least one neighboring cell includes the multimedia broadcast multicast service that the user equipment currently receives or prepares to receive, combine a reference signal measurement value of the serving cell and a reference signal measurement value of the at least one neighboring cell to obtain the combined measurement value.

The description is continued according to Scenario 3 above: The cell A and the cell B are synchronous cells that belong to the same MBMS area area 1, and the cell C does not belong to any MBMS area (for example, the cell C is a unicast cell).

Specifically, the UE is receiving an MBMS service x in the cell A, and during measurement, the UE combines reference signal measurement values of the cell A and the cell B in the area 1, to obtain the combined measurement value a, and compares the combined measurement value a with the reference signal measurement value of the cell C, to determine whether to receive the service x in the cell C, for which there may be two cases as follows:

Case 1: If the UE is in an unconnected state (RRC_IDLE), the UE determines, according to the combined measurement value a of the area 1 and the reference signal measurement value of the cell C, whether to initiate, in the cell C, a request for receiving the multimedia broadcast multicast service x. For example, if the combined measurement value a is less than a preset threshold, or a difference between the combined measurement value a and the reference signal measurement value of the cell C exceeds a preset threshold, the UE initiates, in the cell C, a request for receiving the multimedia broadcast multicast service x.

Case 2: If the UE is in a connected state (RRC_CONNECTED), the UE determines, according to the combined measurement value a and the reference signal measurement value of the cell C, whether to send a measurement report message to the base station. For example, if the combined measurement value a is less than a preset threshold, or a difference between the combined measurement value a and the reference signal measurement value of the cell C exceeds a preset threshold, the UE sends a measurement report message to the base station in a current serving cell (the cell A), and reports the combined measurement value a and the reference signal measurement value of the cell C to the base station.

Further, the cell A and the cell B belong to the same MBMS area, the cell C does not belong to any MBMS area (for example, the cell C is a unicast cell), and the UE is receiving or prepares to receive the multimedia broadcast multicast service x. The UE not only needs to determine that the cell A and the cell B belong to the same MBMS area, but also needs to determine that the cell B also has the multimedia broadcast multicast service x that the UE is receiving or prepares to receive, before the UE can combine the reference signal measurement values of the cell A and the cell B.

Further, for a scenario in which at least two neighboring cells of the UE belong to the same MBMS area, the determining unit 11 is specifically configured to: if areas to which multimedia broadcast multicast services of the at least two neighboring cells belong correspond to a same area identifier, and the at least two neighboring cells have same frequency information, determine that the at least two neighboring cells belong to the same area to which the same multimedia broadcast multicast service belongs.

The combination unit 12 is specifically configured to: during measurement of a reference signal, if the at least two neighboring cells include the multimedia broadcast multicast service that the user equipment currently receives or prepares to receive, combine the reference signal measurement values of the at least two neighboring cells to obtain the combined measurement value.

The description is continued according to Scenario 2 above: The cell A does not belong to any MBMS area (for example, the cell A is a unicast cell), and the cell B and the cell C are two cells in the area 3, where the cell A is a current serving cell of the UE.

Specifically, when the UE is receiving the service x (RRC_CONNECTED state) in the cell A, and the UE learns that the cell B and the cell C have the multimedia broadcast multicast service x (that is, a multimedia broadcast multicast service that the UE is interested in) that the UE currently receives or prepares to receive, the UE determines, according to the combined measurement value c combined for the area 3 and the reference signal measurement value of the cell A, whether the UE needs to receive the multimedia broadcast multicast service x by using the area 3. For example, if the combined measurement value c of the area 3 is higher than a preset threshold, or a difference between the combined measurement value c of the area 3 and the reference signal measurement value of the cell A exceeds a preset threshold, the UE may receive the service in the following two manners:

Optionally, Manner 1: The UE instructs, in the cell A, the base station to break an RRC connection, where a notification message may include a cause indication for breaking the connection, and starts to receive the multimedia broadcast multicast service x from the area 3, where the cause indication is used to instruct the UE to start to receive the multimedia broadcast multicast service x from the area 3.

Manner 2: The UE sends, in the cell A, the measurement report message to the base station. If the base station determines to hand over the UE to the area 3 to receive the multimedia broadcast multicast service x, the base station sends a cell handover instruction message to the UE, to instruct the UE to select the cell A to receive the service x.

The description is continued according to Scenario 1 above: The cell A and the cell B are two cells in area 1, and the cell C is a cell in the area 2, where the cell A is a current serving cell of the UE, and the UE is receiving the multimedia broadcast multicast service x in the cell A, so that operations of the UE are as follows:

First, when the UE learns that the cell B that belongs to the area 1 and the cell C that belongs to the area 2 both have the multimedia broadcast multicast service x (that is, a multimedia broadcast multicast service that the UE is interested in) that the UE currently receives or prepares to receive, the UE combines reference signal measurement values of the area 1 to obtain the combined measurement value a, and compares the combined measurement value a with the reference signal measurement value of the cell C, to determine whether to stop receiving the service multimedia broadcast multicast service x in the area 1, and instead, to receive the multimedia broadcast multicast service x in the cell C. Alternatively, the UE compares the combined measurement value a with the preset threshold, to determine whether to receive the multimedia broadcast multicast service x in the cell C. For example, if the combined measurement value a is less than a preset threshold, or a difference between the combined measurement value a and the reference signal measurement value of the cell C exceeds a preset threshold, the UE sends a measurement report message to the base station in the current serving cell (the cell A), and reports the combined measurement value a and the reference signal measurement value of the cell C to the base station.

It should be noted that, if the area 2 includes multiples cells, reference signal measurement values of the multiple cells are combined to obtain the combined measurement value b. The UE combines the reference signal measurement values of the area 1 to obtain the combined measurement value a, and compares the combined measurement value a with the combined measurement value b of the area 2, to determine whether to stop receiving the service multimedia broadcast multicast service x in the area 1, and instead, to receive the multimedia broadcast multicast service x in the area 2. Alternatively, the UE compares the combined measurement value a with the preset threshold, to determine whether to receive the multimedia broadcast multicast service x in the area 2. For example, if the combined measurement value a is less than a preset threshold, or a difference between the combined measurement value a and the combined measurement value b exceeds a preset threshold, the UE sends a measurement report message to the base station in the current serving cell (the cell A), and reports the combined measurement value a and the reference signal measurement value of the area 2 to the base station.

Further, if the cell A is a current serving cell of the UE, the reference signal measurement values of the cell A and the cell B can be combined only when the UE determines that the cell A and the cell B belong to the same area 1, and determines that the cell B has the multimedia broadcast multicast service x (that is, a multimedia broadcast multicast service that the UE is interested in) that the UE currently receives or prepares to receive. The thresholds involved in the foregoing embodiments and any feasible implementation manner are all preset according to threshold configuration information, where the threshold configuration information is sent by the base station and is received by the UE as described above. In a specific scenario in which an area to which a multimedia broadcast multicast service belongs is a single frequency network area, "the area identifier corresponding to the area to which the multimedia broadcast multicast service of the neighboring cell belongs" in the foregoing embodiments and any implementation manner is specifically a single frequency network area identifier of the neighboring cell, and the first identifier is specifically a single frequency network area identifier corresponding to the area to which the multimedia broadcast multicast service that the user equipment currently receives or prepares to receive belongs.

Moreover, the UE performs cell reselection according to measurement, that is, selects a cell having relatively desirable signal quality to receive the service x.

Figure 3:
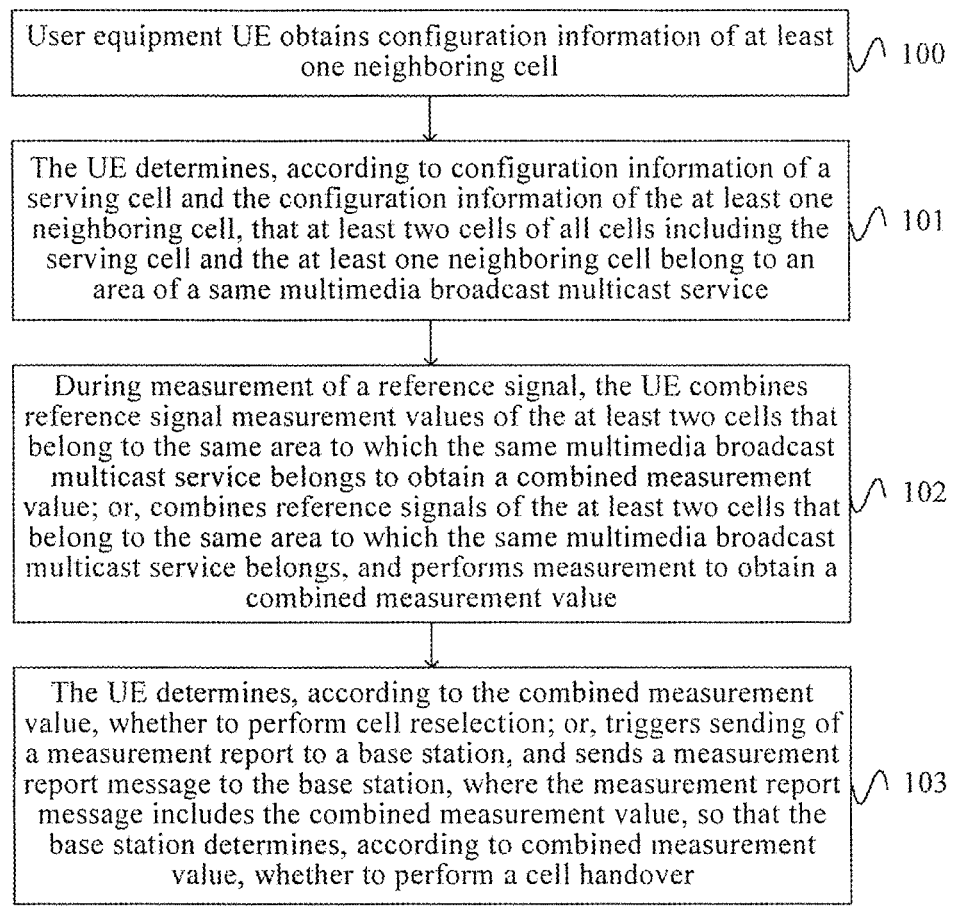
FIG. 3 is a schematic flowchart of a method for ensuring continuous service reception in a wireless network according to an embodiment of the present invention.

FIG. 3 is a schematic flowchart of a method for ensuring continuous service reception in a wireless network according to an embodiment of the present invention. The method is executed by user equipment UE. Specifically, the UE may be user equipment including a mobile phone, a tablet computer, a PDA (personal digital assistant), a POS (Point of Sales, sales terminal), or a vehicle-mounted computer. Referring to FIG. 3, the method includes the following steps:

Step 100: User equipment UE obtains configuration information of at least one neighboring cell.

Step 101: The UE determines, according to configuration information of a serving cell and the configuration information of the at least one neighboring cell, that at least two cells of all cells including the serving cell and the at least one neighboring cell belong to an area of a same multimedia broadcast multicast service.

Step 102: During measurement of a reference signal, the UE combines reference signal measurement values of the at least two cells that belong to the same area to which the same multimedia broadcast multicast service belongs to, obtain a combined measurement value; or, combines reference signals of the at least two cells that belong to the same area to which the same multimedia broadcast multicast service belongs, and performs measurement to obtain a combined measurement value.

Step 103: The UE determines, according to the combined measurement value, whether to perform cell reselection; or, triggers sending of a measurement report to a base station, and sends a measurement report message to the base station, where the measurement report message includes the combined measurement value, so that the base station determines, according to combined measurement value, whether to perform a cell handover.

It should be noted that, after the UE obtains the combined measurement value, for UE in an unconnected state, the UE determines, according to the combined measurement value, to perform cell reselection; and for UE in a connected state, the UE triggers sending of a measurement report to a base station, so that a measurement result is sent to a base station of the serving cell, and the base station determines, according to the combined measurement value, whether to perform a cell handover.

Continue to refer to FIG. 1. Three cells: the cell A, the cell B, and the cell C are used as an example. In two scenarios: a scenario in which the UE moves between two base stations that belong to different MBMS areas, and a scenario in which the UE moves between a base station that belongs to an MBMS area and a base station that belongs to a non-MBMS area, description is provided for using the method for measuring wireless network signal quality in this embodiment to measure radio signal quality.

In Scenario 1: If the cell A and the cell B are two cells that belong to the area 1, and the cell C is a cell that belongs to the area 2, where the cell A is a current serving cell (or a camping cell) of the UE, because different MBMS areas may have a same multimedia broadcast multicast service, when the UE learns that a multimedia broadcast multicast service (that is, a multimedia broadcast multicast service that the UE is interested in) that the UE currently receives or prepares to receive and that is in the area 1 is also being sent in the neighboring area area 2, the combination unit 12 of the UE combines a reference signal measurement value of the cell A in the area 1 and a reference signal measurement value of the cell B in the area 1 to obtain a combined measurement value a, that is, a signal quality measurement value of the area 1, and subsequently the UE determines, according to the combined measurement value a, whether to perform cell reselection. The process may also be referred to as area reselection, that is, the UE reselects from receiving a service in a cell in the area 1 to receiving a service in a cell in the area 2. Alternatively, the UE sends a measurement report message to the base station, where the report includes a combined measurement value a, so that the base station determines, according to the combined measurement value a, whether to perform a cell handover. If the base station determines to perform a cell handover, the base station sends a cell handover command to the UE. The process may also be referred to as an area handover, that is, the UE is handed over from receiving a service in a cell in the area 1 to receiving a service in a cell in the area 2. If the base station determines to perform an area handover, the base station sends an area handover command to the UE, where the message includes at least identifier information of a target area to which the UE is handed over, for example, an identifier of an area and a frequency identifier of an area. Specifically, a feasible implementation manner is: The UE determines, according to a preconfigured threshold, whether to initiate cell reselection, area reselection, a cell handover or an area handover. The preconfigured threshold may be notified by the base station to the UE by using a dedicated message, or may be broadcast to the UE by using a broadcast message, or may be a configuration threshold implemented in the UE. When the combined measurement value a reaches the preconfigured threshold, the UE determines, according to the combined measurement value a, not to perform cell reselection, or not to perform area reselection. For example, when the combined measurement value a rises to or exceeds the preconfigured threshold, it indicates that in this case, wireless network signal quality of the area 1 meets a requirement for receiving a service by the UE, and the UE still receives or prepares to receive the multimedia broadcast multicast service by using the area 1, instead of selecting the cell C or a cell D in the area 2 as a cell for receiving or preparing to receive the service, or instead of selecting the area 2 as an area for receiving or preparing to receive the service. Alternatively, when the combined measurement value a reaches the preconfigured threshold, the UE is triggered to send the foregoing measurement report message to the base station. Another feasible implementation manner is: When the combined measurement value a is less than or drops to the preconfigured threshold, the UE determines, according to the combined measurement value a, to perform cell reselection, or to perform area reselection. Alternatively, when the combined measurement value a is less than or drops to the preconfigured threshold, the UE is triggered to send the foregoing measurement report message to the base station. How the UE configures a threshold is described in detail below.

Further, if the area 2 further includes the cell D in addition to the cell C, and the cell C and the cell D that belong to the area 2 both have a multimedia broadcast multicast service (that is, a multimedia broadcast multicast service that the UE is interested in) that the UE currently receives or prepares to receive, the UE combines a reference signal measurement value of the cell C in the area 2 and a reference signal measurement value of the cell D in the area 2 to obtain a combined measurement value b. In this case, the UE obtains both the combined measurement value a of the area 1 and the combined measurement value b of the area 2, and the UE determines, according to the combined measurement value a and the combined measurement value b, whether to perform cell reselection or area reselection. Alternatively, the UE determines, according to the combined measurement value a and the combined measurement value b, whether to trigger a measurement report message. If the UE determines to trigger a measurement report message, the UE sends a measurement report message to the base station, where the measurement report message includes the combined measurement value a and the combined measurement value b, so that the base station determines, according to the combined measurement value a and the combined measurement value b, whether to perform a cell handover. If the base station determines to perform a cell handover, the base station sends a cell handover command to the UE. The process may also be referred to as an area handover, that is, the UE is handed over from receiving a service in a cell in the area 1 to receiving a service in a cell in the area 2. If the base station determines to perform an area handover, the base station sends an area handover command to the UE, where the message includes at least identifier information of a target area to which the UE is handed over, for example, an identifier of an area and a frequency identifier of an area. Specifically, a feasible implementation manner is: The UE compares the combined measurement value a with the combined measurement value b. Further, the UE may directly compare the combined measurement value a with the combined measurement value b, or, may compare a difference between the combined measurement value a and the combined measurement value b with a preset threshold, for example, to find whether the difference between the combined measurement values a and b reaches or exceeds the preset threshold. If the combined measurement value a is better than the combined measurement value b, because the current serving cell of the UE is the cell A, the UE still receives or prepares to receive a multimedia broadcast multicast service by using the area 1, instead of selecting the cell C or the cell D in the area 2. If the combined measurement value b is better than the combined measurement value a, the area 2 is selected to receive or prepare to receive a multimedia broadcast multicast service, and specifically, the UE selects the cell C or the cell D in the area 2 as a serving cell. Another feasible implementation manner is: The handover unit 13 sends a measurement report message to the base station, where the measurement report message includes the combined measurement value a and the combined measurement value b, and the base station compares the combined measurement value a with the combined measurement value b. Specifically, the UE may directly compare the combined measurement value a with the combined measurement value b, or, may compare a difference between the combined measurement value a and the combined measurement value b with a preset threshold. If the combined measurement value a is better than the combined measurement value b, because the current serving cell of the UE is the cell A, the base station instructs the UE not to perform a handover, and instructs the UE to still receive or prepare to receive a multimedia broadcast multicast service by using the area 1, instead of being handed over to the cell C or the cell D in the area 2. If the combined measurement value b is better than the combined measurement value a, the base station instructs the UE to be handed over to the area 2 to receive or prepare to receive a multimedia broadcast multicast service. Specifically, the base station instructs the UE to be handed over to the cell C or the cell D in the area 2.

It should be noted that, for Scenario 1, the UE or the base station of the serving cell needs to learn in advance that two MBMS areas have a multimedia broadcast multicast service that the UE currently receives or prepares to receive. If in an MBMS area, there is no multimedia broadcast multicast service that the UE currently receives or prepares to receive, the UE cannot select the MBMS area to receive a multimedia broadcast multicast service, that is, during measurement for area selection, only an area including a multimedia broadcast multicast service that the UE currently receives or prepares to receive is considered, or only a measurement result, of an area including a multimedia broadcast multicast service that the UE currently receives or prepares to receive, in a measurement report message is considered. For a measurement result of an area not including a multimedia broadcast multicast service that the UE currently receives or prepares to receive, the base station cannot instruct the UE to be handed over to the MBMS area; otherwise, the service is interrupted. However, when the UE is handed over from one cell in the MBMS area to a unicast cell, there is no such limitation. There is no such limitation because a unicast service is a dedicated transmission resource established for the UE.

Scenario 2: The cell A does not belong to any MBMS area (for example, the cell A is a unicast cell), and the cell B and the cell C are two cells in the area 3, where the cell A is a current serving cell (or camping cell) of the UE. When a multimedia broadcast multicast service (that is, a multimedia broadcast multicast service that the UE is interested in) that the UE currently receives or prepares to receive and that is in the cell A is also being sent in the neighboring cell area 3, the UE of the UE combines a reference signal measurement value of the cell B in the area 3 and a reference signal measurement value of the cell C in the area 3 to obtain a combined measurement value c, that is, a signal quality measurement value of the area 3. Subsequently, the UE determines, according to the combined measurement value c, whether to perform cell reselection or area reselection. Alternatively, the UE determines, according to the combined measurement value c, whether to trigger a measurement report, and sends a measurement report message to the base station, where the measurement report message includes the combined measurement value c, so that the base station determines, according to the combined measurement value c, whether to perform a cell handover. Specifically, a feasible implementation manner is: The UE determines, according to a preconfigured threshold, whether to initiate cell reselection, area reselection, a cell handover, or an area handover, where the preconfigured threshold may be notified by the base station to the UE by using a dedicated message, or may be broadcast to the UE by using a broadcast message, or may be a configuration threshold implemented in the UE. When the combined measurement value c reaches the preconfigured threshold, the UE determines, according to the combined measurement value c, whether to perform cell reselection or area reselection. For example, when the combined measurement value c reaches the preconfigured threshold, it indicates that in this case, wireless network signal quality of the area 3 meets a requirement for receiving broadcast multicast service data by the UE, and the UE chooses to use the area 3 to receive or prepare to receive a multimedia broadcast multicast service. Alternatively, the UE triggers a measurement report and sends the foregoing measurement report message to the base station. Another feasible implementation manner is: When the combined measurement value c is less than/or drops to the preconfigured threshold, the UE determines, according to the combined measurement value c, whether to perform cell reselection or area reselection. Alternatively, when the combined measurement value c is less than/or drops to the preconfigured threshold, the UE triggers sending of the foregoing measurement report to the base station.

Scenario 3: The cell A and the cell B are two cells that belong to the area 1, the cell C does not belong to any MBMS area (for example, the cell C is a unicast cell), the UE is receiving or prepares to receive a service x broadcast in the area 1, and the UE determines that transmission of the broadcast multicast service x is supported in the cell C. Therefore, the UE combines a reference signal measurement value of the cell A that belongs to the area 1 and a reference signal measurement value of the cell B that belongs to the area 1 to obtain a combined measurement value a, that is, a signal quality measurement value of the area 1. Subsequently, the UE determines, according to the combined measurement value a, whether to perform cell reselection. Alternatively, the UE determines whether to trigger a measurement report. If the UE determines to send a measurement report message to the base station, the measurement report message includes the combined measurement value a, so that the base station determines, according to the combined measurement value a, whether to perform a cell handover. Specifically, a feasible implementation manner is: The UE compares, according to a preconfigured threshold, the combined measurement value a with the preconfigured threshold. The UE determines, according to a result of comparing the combined measurement value a with the preconfigured threshold, whether to perform cell reselection or area reselection. For example, when the combined measurement value a reaches or exceeds the preconfigured threshold, it indicates that in this case, wireless network signal quality of the area 1 meets a requirement of the UE, and the UE still receives or prepares to receive a multimedia broadcast multicast service by using the area 3, and does not need to select the cell C as a serving cell. Alternatively, when the combined measurement value a reaches the preconfigured threshold, the UE is triggered to send the foregoing measurement report message to the base station. Another feasible implementation manner is: When the combined measurement value a is less than or drops to the preconfigured threshold, the UE determines, according to the combined measurement value a, whether to perform cell reselection. Alternatively, when the combined measurement value a is less than or drops to the preconfigured threshold, the UE is triggered to send the foregoing measurement report message to the base station.

Further, for Scenario 2 and Scenario 3, another feasible implementation manner is: The UE compares a combined measurement value of areas to which a same multimedia broadcast multicast service belongs with a reference signal measurement value of another cell that does not belong to an area to which any multimedia broadcast multicast service belongs, to determine whether to perform cell reselection, or to perform area reselection. Alternatively, the UE sends a measurement report message that includes a combined measurement value and a reference signal measurement value to the base station, and the base station compares the combined measurement value with a reference signal measurement value of another cell, to determine whether to perform a cell handover. The implementation manner is described in detail below.

For Scenario 1, Scenario 2, and Scenario 3, before the UE measures area signal quality, the base station may send an area measurement configuration message to the UE by using a dedicated message or a system broadcast, where the measurement configuration message includes any one of or any combination of the following parameters: identifier information of an area to be measured; and a signal quality type, for example, a reference signal received power (RSRP for short) and/or reference signal received quality (RSRQ for short), of an area to be measured.

Further, the measurement configuration message may further include: frequency channel number information of an area to be measured; identifier information of a cell corresponding to an area to be measured; identifier information that needs to be deleted and that is of an area to be measured; and identifier information that needs to be updated and that is of an area to be measured.

It should be noted that for an MBMS area involved in each embodiment of the present invention, a smallest unit of the MBMS area is a cell, that is, one MBMS area includes at least one cell. Additionally, in this embodiment, three cells are used for description. A quantity of neighboring cells whose configuration information is obtained by the UE during movement is determined according to an actual cell distribution scenario, and is not limited in this embodiment, as long as it is determined that multiple cells belong to a same MBMS area. Reference signal measurement values of all cells that belong to a same MBMS area are combined, and then, according to a combined measurement value of different MBMS areas or according to a combined measurement value of MBMS areas and a reference signal measurement value of a cell in a non-MBMS area, the UE determines whether to perform cell reselection, or the base station determines whether to perform a cell handover.

According to the method for ensuring continuous service reception in a wireless network provided in this embodiment, user equipment UE obtains configuration information of at least one neighboring cell; the UE determines, according to configuration information of a serving cell and the configuration information of the at least one neighboring cell, that at least two cells of all cells including the serving cell and the at least one neighboring cell belong to a same area to which a same multimedia broadcast multicast service belongs; subsequently, during measurement of a reference signal, the UE combines reference signal measurement values of the at least two cells that belong to the same area to which the same multimedia broadcast multicast service belongs to, obtain a combined measurement value; or, combines reference signals of the at least two cells that belong to the same area to which the same multimedia broadcast multicast service belongs, and performs measurement to obtain a combined measurement value; and the UE determines, according to the combined measurement value, whether to perform cell reselection; or, triggers sending of a measurement report to a base station, and sends a measurement report message to the base station, where the measurement report message includes the combined measurement value, so that the base station determines, according to the combined measurement value, whether to perform a cell handover. Therefore, in a subsequent handover determining process, UE or a base station of a serving cell considers overall signal strength of an MBMS area, and radio signal quality of a single cell is prevented from being underestimated, so that an unnecessary handover procedure is avoided, and handover occasions become more appropriate, thereby ensuring quality of a radio signal obtained by UE.

It should be noted that, in an LTE wireless communications network, to determine radio signal quality of a location of the UE, the UE needs to measure a reference signal of a serving cell or a camping cell of the UE. In consideration of mobility of the UE, the UE also needs to perform measurement on neighboring cells. These measurement quantities include a reference signal received power (RSRP for short), reference signal received quality (RSRQ for short), and the like. The RSRP and the RSRQ are relatively important measurement quantities among all measurement quantities.

The RSRP is a reference signal received power, and is defined as a linear average value of received powers of corresponding cell-specific reference signals (CRS for short) on corresponding resource elements (RE for short) that carry all CRS ports for measuring an RSRP within a measurement bandwidth. For measurement of an RSRP, the UE needs to use a CRS port 0 to perform measurement. When the UE can reliably detect a CRS port 1, while using the CRS port 0, the UE may use both the port 1 and the port 0 to determine an RSRP. The RSRQ is N×RSRP/(E-UTRA carrier RSSI), where N is a quantity of resource blocks (RB for short) of a measurement bandwidth for measuring an E-UTRA network carrier received signal strength indicator in an E-UTRA system, and the numerator the denominator need to correspond to a same quantity of resources. The E-UTRA carrier RSSI is a linear average value of a total received power that is measured on N RBs within a specified measurement bandwidth and that is on OFDM symbols that carry a CRS reference signal antenna port 0, and includes co-channel interference of a serving cell, interference caused by a non-serving cell, adjacent-channel interference, thermal noise, and the like. If upper layer signaling indicates a specific subframe for measuring RSRQ, the RSSI is measured on all OFDM symbols of the corresponding subframe.

When an RSRP, measured by the UE, of a cell is larger, a signal received by the UE from the cell is stronger. When RSRQ, measured by the UE, of a cell is larger, quality of a signal received by the UE from the cell is higher.

When the UE performs measurement (measurement of an RSRP, RSRQ, and an RSSI) of RRM radio resource management, the UE performs measurement multiple times within a measurement bandwidth and within a time range and then calculates a linear average value to obtain a corresponding RRM measurement value. For example, RSRP measurement values are measured 5 times within 200 ms and a linear average value is then calculated, to obtain a corresponding RSRP measurement value.

The RRM measurement value is mainly used for mobility management and the like of the UE. For example, an RSRP represents an average received power of reference signals from a cell to the UE. When the UE moves in a direction away from the cell B, an RSRP, measured and fed back by the UE, of the cell B gradually decreases. When the UE moves in a direction approaching the cell A, an RSRP, measured and fed back by the UE, of the cell A gradually increases. That is, during movement, the UE keeps measuring and feeding back each RRM measurement value, and then the base station finds, by using the corresponding RRM measurement value, whether the cell that provides a service to the UE needs to be changed, and the like.

Further, after the UE determines to perform cell reselection or the base station instructs the UE to perform a cell handover, if a target cell is a unicast transmission cell, the UE needs to learn whether a multimedia broadcast multicast service that the UE currently receives or prepares to receive supports unicast transmission. Therefore, further, the UE further needs to obtain unicast transmission indication information of a multimedia broadcast multicast service that the UE currently receives or prepares to receive. The unicast transmission indication information is used to indicate whether the service supports unicast transmission indication information. If the unicast transmission indication information indicates that the service supports unicast transmission, when the foregoing measurement result meets a cell reselection condition, the UE determines to perform cell reselection.

Alternatively, the foregoing unicast transmission indication information of a multimedia broadcast multicast service that the UE currently receives or prepares to receive may also be obtained by the base station. After the base station receives a measurement report message sent by the UE, if it is determined according to a measurement result included in the measurement report message that a cell handover condition is met and a target cell is a unicast transmission cell, in this case, the base station determines, according to unicast transmission indication information of the service, whether the service supports unicast transmission. If the unicast transmission indication information indicates that the service supports unicast transmission, the base station instructs the UE to perform a cell handover.

It should be noted that for the foregoing two cases, if the unicast transmission indication information indicates that the service does not support unicast transmission, the UE does not select the target cell as a serving cell, and the base station does not instruct the UE to be handed over to the target cell.

Further, in two scenarios: a scenario in which a serving cell does not belong to any MBMS area, and at least two neighboring cells belong to one MBMS area area 3, and a scenario in which a serving cell and at least one neighboring cell belong to one MBMS area area 1, and at least one neighboring cell does not belong to any MBMS area, in addition to the foregoing manner in which the UE determines, according to a combined measurement value, whether to perform cell reselection or the base station determines, according to a combined measurement value, whether to perform a cell handover, step 103 in FIG. 3 may also be implemented in the following feasible implementation manner:

Step 103a: Compare a combined measurement value with a reference signal measurement value of at least one other cell, to determine whether to perform cell reselection; or, Step 103b: The measurement report message sent to the base station further includes, in addition to the combined measurement value, a reference signal measurement value of at least one other cell, so that the base station compares the combined measurement value with a reference signal measurement value of at least one other cell, to determine whether to perform a cell handover.

The other cell refers to a cell, which does not belong to an area to which any multimedia broadcast multicast service belongs, of all the cells including the serving cell and the at least one neighboring cell.

For specific implementation manners of step 103a and step 103b, reference may be made to the description of the solutions of Scenario 2 and Scenario 3 above, which are not described in detail herein again.

It should be noted that, only a case having three cells is described in the foregoing three scenarios. When multiple MBMS areas include at least two cells, and each MBMS area has a multimedia broadcast multicast service (that is, a multimedia broadcast multicast service that the UE is interested in) that the UE currently receives or prepares to receive, reference signal measurement values in all the MBMS areas are combined respectively, to obtain a combined measurement value of each MBMS area. The UE compares the multiple combined measurement values, or compares the combined measurement values with a preconfigured threshold. A specific comparison manner of the UE is similar to the foregoing comparison manner, so that the UE determines whether to perform cell reselection; or, the UE is triggered to send a measurement report message to the base station, so that the base station determines whether to perform a cell handover.

Further, in step 100 in FIG. 1, the configuration information may be obtained in the following manners:

Implementation Manner 1:

Step 100a: The UE receives a broadcast multicast signal measurement configuration message, sent by a source base station, of the at least one neighboring cell, where the broadcast multicast signal measurement configuration message of the neighboring cell includes the configuration information of the neighboring cell.

Implementation Manner 2:

Step 100b: The UE reads a broadcast sent by a source base station, where the broadcast includes the configuration information of the neighboring cell.

For Implementation manner 1 and Implementation manner 2, the configuration information of the neighboring cell specifically includes an area identifier corresponding to an area to which a multimedia broadcast multicast service of the neighboring cell belongs and frequency information of the neighboring cell, where the frequency information of the neighboring cell includes a frequency of the neighboring cell and/or identifier information of a frequency layer.

It is learned according to the area identifier corresponding to the area to which the multimedia broadcast multicast service of the neighboring cell belongs and the frequency information of the neighboring cell that a frequency layer and/or a broadcast multicast area of a measurement target correspond/corresponds to one cell, and the UE only measures a broadcast multicast reference signal of the cell, and uses a reference signal measurement value of the cell as a reference signal measurement value of a broadcast multicast reference signal of a frequency layer and/or a broadcast multicast area of a target area. One piece of identifier information of a frequency layer may correspond to one or more pieces of broadcast multicast cell identifier information; and one broadcast multicast area may correspond to one or more pieces of broadcast multicast cell identifier information.

It is learned according to the area identifier corresponding to the area to which the multimedia broadcast multicast service of the neighboring cell belongs and the frequency information of the neighboring cell that a frequency layer and/or a broadcast multicast area of a measurement target correspond/corresponds to multiple cells, and the UE performs combined measurement on broadcast multicast reference signals of multiple cells corresponding to the frequency layer and/or the broadcast multicast area that belong/belongs to the target; or respectively performs separate measurement on broadcast multicast reference signals of multiple cells corresponding to the frequency layer and/or the broadcast multicast area that belong/belongs to the target, and combines measurement results to obtain a combined measurement value, where the combined measurement value is used as a measurement result of the broadcast multicast reference signals of the frequency layer and/or the broadcast multicast area of the target. The UE may also measure a neighboring cell to find cells/a cell included in the frequency layer and/or the broadcast multicast area that belong/belongs to the target to be measured.

Further, the configuration information of the neighboring cell further includes threshold configuration information and/or identifier information of the neighboring cell.

After obtaining a threshold configuration, the UE sets a corresponding threshold according to the threshold configuration, and after obtaining a combined measurement value corresponding to an area corresponding to an area to which at least one multimedia broadcast multicast service belongs, compares the combined measurement value with a threshold that is preconfigured by the UE according to the threshold configuration information. A feasible implementation manner is: In a case of only one combined measurement value, the UE preconfigures a threshold, and when the combined measurement value reaches the preconfigured threshold, the UE determines, according to the combined measurement value, whether to perform cell reselection. Alternatively, when the combined measurement value reaches the preconfigured threshold, the UE sends the foregoing measurement report message to the base station. Another feasible implementation manner is: When the combined measurement value is less than or drops to the preconfigured threshold, the UE determines, according to the combined measurement value, whether to perform cell reselection. Alternatively, when the combined measurement value is less than or drops to a preconfigured threshold, the UE sends the foregoing measurement report message to the base station.

A function of identifier information of a neighboring cell is that when the UE learns that multiple neighboring cells belong to a same area to which a same multimedia broadcast multicast service belongs, the UE combines, according to identifier information of each neighboring cell, reference signal measurement values of all neighboring cells inside the area, to obtain a combined measurement value; or, when the UE learns that a current serving cell and at least one neighboring cell belong to a same area to which a same multimedia broadcast multicast service belongs, the UE combines, according to identifier information of the neighboring cell and identifier information of the serving cell, reference signal measurement values of the at least one neighboring cell and the serving cell, to obtain a combined measurement value.

Further, for a scenario in which the current serving cell of the UE and at least one neighboring cell belong to a same MBMS area, a feasible implementation manner of step 101 in FIG. 3 is:

Step 101a: If a first identifier is the same as the area identifier corresponding to the area to which the multimedia broadcast multicast service of the at least one neighboring cell belongs, and frequency information of the serving cell is the same as the frequency information of the at least one neighboring cell, the UE determines that the serving cell and the at least one neighboring cell belong to the same area to which the same multimedia broadcast multicast service belongs.

The configuration information of the serving cell includes the first identifier and the frequency information of the serving cell, where the first identifier is an area identifier corresponding to an area to which the multimedia broadcast multicast service that the user equipment currently receives or prepares to receive belongs, and the frequency information of the serving cell includes a frequency of the serving cell and/or identifier information of a frequency layer.

A feasible implementation manner of step 102 in FIG. 3 is:

Step 102a: During measurement of a reference signal, if the at least one neighboring cell includes the multimedia broadcast multicast service that the UE currently receives or prepares to receive, the UE combines a reference signal measurement value of the serving cell and a reference signal measurement value of the at least one neighboring cell to obtain the combined measurement value.

The description is continued according to Scenario 3 above: The cell A and the cell B are synchronous cells that belong to the same MBMS area area 1, and the cell C does not belong to any MBMS area (for example, the cell C is a unicast cell).

Specifically, the UE is receiving an MBMS service x in the cell A, and during measurement, the UE combines reference signal measurement values of the cell A and the cell B in the area 1, to obtain the combined measurement value a, and compares the combined measurement value a with the reference signal measurement value of the cell C, to determine whether to receive the service x in the cell C, for which there may be two cases as follows:

Case 1: If the UE is in an unconnected state (RRC_IDLE), the UE determines, according to the combined measurement value a of the area 1 and the reference signal measurement value of the cell C, whether to initiate, in the cell C, a request for receiving the multimedia broadcast multicast service x. For example, if the combined measurement value a is less than a preset threshold, or a difference between the combined measurement value a and the reference signal measurement value of the cell C exceeds a preset threshold, the UE initiates, in the cell C, a request for receiving the multimedia broadcast multicast service x.

Case 2: If the UE is in a connected state (RRC_CONNECTED), the UE determines, according to the combined measurement value a and the reference signal measurement value of the cell C, whether to send a measurement report message to the base station. For example, if the combined measurement value a is less than a preset threshold, or a difference between the combined measurement value a and the reference signal measurement value of the cell C exceeds a preset threshold, the UE sends a measurement report message to the base station in a current serving cell (the cell A), and reports the combined measurement value a and the reference signal measurement value of the cell C to the base station.

Further, the cell A and the cell B belong to the same MBMS area, the cell C does not belong to any MBMS area (for example, the cell C is a unicast cell), and the UE is receiving or prepares to receive the multimedia broadcast multicast service x. The UE not only needs to determine that the cell A and the cell B belong to the same MBMS area, but also needs to determine that the cell B also has the multimedia broadcast multicast service x that the UE is receiving or prepares to receive, before the UE can combine the reference signal measurement values of the cell A and the cell B.

Further, for a scenario in which at least two neighboring cells of the UE belong to the same MBMS area, a feasible implementation manner of step 101 in FIG. 3 is:

Step 101b: If areas to which multimedia broadcast multicast services of the at least two neighboring cells belong correspond to a same area identifier, and the at least two neighboring cells have same frequency information, the UE determines that the at least two neighboring cells belong to the same area to which the same multimedia broadcast multicast service belongs.

A feasible implementation manner of step 102 in FIG. 3 is:

Step 102b: During measurement of a reference signal, if the at least two neighboring cells include the multimedia broadcast multicast service that the user equipment currently receives or prepares to receive, the UE combines the reference signal measurement values of the at least two neighboring cells to obtain the combined measurement value.

The description is continued according to Scenario 2 above: The cell A does not belong to any MBMS area (for example, the cell A is a unicast cell), and the cell B and the cell C are two cells in the area 3, where the cell A is a current serving cell of the UE.

Specifically, when the UE is receiving the service x (RRC_CONNECTED state) in the cell A, and the UE learns that the cell B and the cell C have the multimedia broadcast multicast service x (that is, a multimedia broadcast multicast service that the UE is interested in) that the UE currently receives or prepares to receive, the UE determines, according to the combined measurement value c combined for the area 3 and the reference signal measurement value of the cell A, whether the UE needs to receive the multimedia broadcast multicast service x by using the area 3. For example, if the combined measurement value c of the area 3 is higher than a preset threshold, or a difference between the combined measurement value c of the area 3 and the reference signal measurement value of the cell A exceeds a preset threshold, the UE may receive the service in the following two manners:

Optionally, Manner 1: The UE instructs, in the cell A, the base station to break an RRC connection, where a notification message may include a cause indication for breaking the connection, and starts to receive the multimedia broadcast multicast service x from the area 3, where the cause indication is used to instruct the UE to start to receive the multimedia broadcast multicast service x from the area 3.

Manner 2: The UE sends, in the cell A, the measurement report message to the base station. If the base station determines to hand over the UE to the area 3 to receive the multimedia broadcast multicast service x, the base station sends a cell handover instruction message to the UE, to instruct the UE to select the cell A to receive the service x.

The description is continued according to Scenario 1 above: The cell A and the cell B are two cells in area 1, and the cell C is a cell in the area 2, where the cell A is a current serving cell of the UE, and the UE is receiving the multimedia broadcast multicast service x in the cell A, so that operations of the UE are as follows:

First, when the UE learns that the cell B that belongs to the area 1 and the cell C that belongs to the area 2 both have the multimedia broadcast multicast service x (that is, a multimedia broadcast multicast service that the UE is interested in) that the UE currently receives or prepares to receive, the UE combines reference signal measurement values of the area 1 to obtain the combined measurement value a, and compares the combined measurement value a with the reference signal measurement value of the cell C, to determine whether to stop receiving the service multimedia broadcast multicast service x in the area 1, and instead, to receive the multimedia broadcast multicast service x in the cell C. Alternatively, the UE compares the combined measurement value a with the preset threshold, to determine whether to receive the multimedia broadcast multicast service x in the cell C. For example, if the combined measurement value a is less than a preset threshold, or a difference between the combined measurement value a and the reference signal measurement value of the cell C exceeds a preset threshold, the UE sends a measurement report message to the base station in the current serving cell (the cell A), and reports the combined measurement value a and the reference signal measurement value of the cell C to the base station.

It should be noted that, if the area 2 includes multiples cells, reference signal measurement values of the multiple cells are combined to obtain the combined measurement value b. The UE combines the reference signal measurement values of the area 1 to obtain the combined measurement value a, and compares the combined measurement value a with the combined measurement value b of the area 2, to determine whether to stop receiving the service multimedia broadcast multicast service x in the area 1, and instead, to receive the multimedia broadcast multicast service x in the area 2. Alternatively, the UE compares the combined measurement value a with the preset threshold, to determine whether to receive the multimedia broadcast multicast service x in the area 2. For example, if the combined measurement value a is less than a preset threshold, or a difference between the combined measurement value a and the combined measurement value b exceeds a preset threshold, the UE sends a measurement report message to the base station in the current serving cell (the cell A), and reports the combined measurement value a and the reference signal measurement value of the area 2 to the base station.

Further, if the cell A is a current serving cell of the UE, the reference signal measurement values of the cell A and the cell B can be combined only when the UE determines that the cell A and the cell B belong to the same area 1, and determines that the cell B has the multimedia broadcast multicast service x (that is, a multimedia broadcast multicast service that the UE is interested in) that the UE currently receives or prepares to receive. The thresholds involved in the foregoing embodiments and any feasible implementation manner are all preset according to threshold configuration information, where the threshold configuration information is sent by the base station and is received by the UE as described above. In a specific scenario in which an area to which a multimedia broadcast multicast service belongs is a single frequency network area, "the area identifier corresponding to the area to which the multimedia broadcast multicast service of the neighboring cell belongs" in the foregoing embodiments and any implementation manner is specifically a single frequency network area identifier of the neighboring cell, and the first identifier is specifically a single frequency network area identifier corresponding to the area to which the multimedia broadcast multicast service that the user equipment currently receives or prepares to receive belongs.

Moreover, the UE performs cell reselection according to measurement, that is, selects a cell having relatively desirable signal quality to receive the service x.

Figure 4:
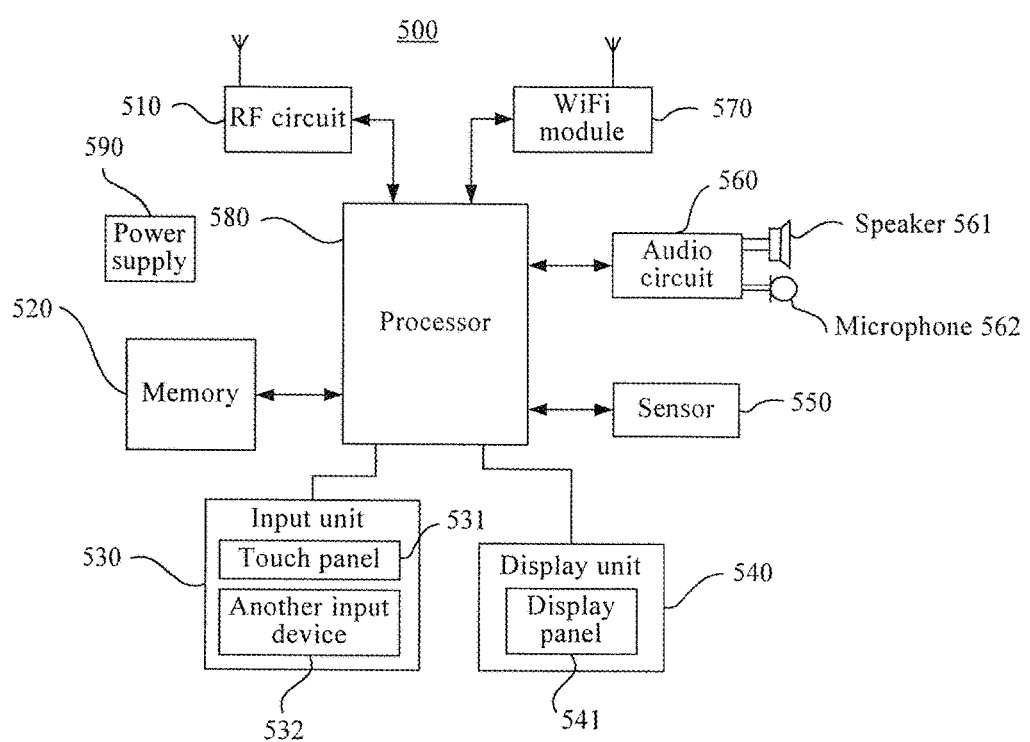
FIG. 4 is a schematic structural diagram of another user equipment according to an embodiment of the present invention.

An embodiment of the present invention provides user equipment, which may be configured to perform the method for measuring wireless network signal quality in the foregoing embodiment of the present invention. FIG. 4 is a schematic structural diagram of another user equipment according to an embodiment of the present invention.

The user equipment 500 may be user equipment including a mobile phone, a tablet computer, a PDA (personal digital assistant), a POS (Point of Sales, sales terminal), a vehicle-mounted computer, or the like. An example in which the user equipment is a mobile phone is used, and FIG. 4 is a block diagram of a partial structure of a mobile phone 500 related to the user equipment according to an embodiment of the present invention. Referring to FIG. 4, the mobile phone 500 includes components such as a radio frequency (RF for short) circuit 510, a memory 520, an input unit 530, a display unit 540, a sensor 550, an audio circuit 560, a WiFi (wireless fidelity) module 570, a processor 580, and a power supply 590. Persons skilled in the art may understand that the structure of the mobile phone in FIG. 4 is only an example of an implementation manner, and does not constituent any limitation on the mobile phone, and the mobile phone may include more components or fewer components than those shown in the figure, or may combine some components, or may have a different component deployment.

Components of the mobile phone 500 are specifically described below with reference to FIG. 4:

The RF circuit 510 may be configured to receive and send signals during an information receiving and sending process or a call process. Particularly, the RF circuit 510 receives downlink information from a base station, then delivers the downlink information to the processor 580 for processing, and sends designed uplink data to the base station. Generally, the RF circuit includes, but is not limited to, an antenna, at least one amplifier, a transceiver, a coupler, an LNA (low noise amplifier), or a duplexer. In addition, the RF circuit 510 may further communicate with a network and another device by means of wireless communication. The wireless communication may use any communication standard or protocol, which includes, but is not limited to, a GSM (Global System of Mobile Communications), a GPRS (General Packet Radio Service), CDMA (Code Division Multiple Access), WCDMA (Wideband Code Division Multiple Access), LTE (Long Term Evolution), an e-mail, an SMS (Short Message Service).

The memory 520 may be configured to store a software program and module. The processor 580 runs the software program and module stored in the memory 520, to implement various functional applications and data processing of the mobile phone 500. The memory 520 may mainly include a program storage area and a data storage area, where the program storage area may store an operating system, an application program required by at least one function (such as a sound playback function and an image display function), and the like; and the data storage area may store data (such as audio data and a telephone directory) created according to use of the mobile phone 500, and the like. In addition, the memory 520 may include a high-speed random access memory, and may also include a non-volatile memory, for example, at least one magnetic disk storage device, a flash memory, or another volatile solid-state storage device.

The input unit 530 may be configured to receive input digit or character information, and generate a keyboard signal input related to the user setting and function control of the mobile phone 500. Specifically, the input unit 530 may include a touch panel 531 and another input device 532. The touch panel 531, also referred to as a touchscreen, may collect a touch operation of a user on or near the touch panel 531 (such as an operation of a user on the touch panel 531 or near the touch panel 131 by using any suitable object or accessory such as a finger or a stylus), and drive a corresponding connection apparatus according to a preset program. Optionally, the touch panel 531 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 580. Moreover, the touch controller can receive and execute a command sent from the processor 580. In addition, the touch panel 531 may be a resistive, capacitive, infrared, or surface acoustic touch panel. Besides the touch panel 531, the input unit 530 may further include the other input device 532. Specifically, the another input device 532 may include, but is not limited to, one or more of a physical keyboard, a functional key (such as a volume control key or a switch key), a trackball, a mouse, and a joystick.

The display unit 540 may be configured to display information input by the user or information provided for the user, and various menus of the mobile phone 500. The display unit 540 may include a display panel 541. Optionally, the display panel 541 may be configured by using an LCD (liquid crystal display), an OLED (organic light-emitting diode), or the like. Further, the touch panel 531 may cover the display panel 541. After detecting a touch operation on or near the touch panel 531, the touch panel 531 transfers the touch operation to the processor 580, so as to determine the type of the touch event. Then, the processor 580 provides a corresponding visual output on the display panel 541 according to the type of the touch event. Although in FIG. 4, the touch panel 531 and the display panel 541 are used as two separate components to implement input and output functions of the mobile phone 500, in some embodiments, the touch panel 531 and the display panel 541 may be integrated to implement the input and output functions of the mobile phone 500.

The mobile phone 500 may further include at least one sensor 550, such as an optical sensor, a motion sensor, and other sensors. Specifically, the optical sensor may include an ambient light sensor and a proximity sensor. The ambient light sensor may adjust luminance of the display panel 541 according to brightness of the ambient light. The proximity sensor may switch off the display panel 541 and/or backlight when the mobile phone 500 is moved to the ear. As one type of motion sensor, an acceleration sensor can detect magnitude of accelerations in various directions (generally on three axes), can detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. As for other sensors such as a gyroscope, a barometer, a hygrometer, a thermometer, and an infrared sensor that may be further configured in the mobile phone 500, details are not described herein again.

The audio circuit 560, a speaker 561, and a microphone 562 may provide audio interfaces between the user and the mobile phone 500. The audio circuit 560 may convert received audio data into an electric signal and transmit the electric signal to the speaker 561. The speaker 561 converts the electric signal into a sound signal for output. On the other hand, the microphone 562 converts a collected sound signal into an electric signal. The audio circuit 560 receives the electric signal and converts the electric signal into audio data, and outputs the audio data to the processor 580 for processing. Then, the processor 580 sends the audio data to, for example, another mobile phone by using the RF circuit 510, or outputs the audio data to the memory 520 for further processing.

WiFi belongs to a short distance wireless transmission technology. The mobile phone 500 may help, by using the WiFi module 570, the user to receive and send e-mails, browse a webpage, access streaming media, and so on, which provides wireless broadband Internet access for the user. Although FIG. 4 shows the WiFi module 570, it may be understood that the WiFi module 570 is not a necessary component of the mobile phone 500, and when required, the WiFi module 570 may be omitted as long as the scope of the essence of the present invention is not changed.

The processor 580 is a control center of the mobile phone 500, and is connected to various parts of the mobile phone by using various interfaces and lines. By running or executing a software program and/or module stored in the memory 520, and invoking data stored in the memory 520, the processor 580 performs various functions and data processing of the mobile phone 500, thereby performing overall monitoring on the mobile phone. Optionally, the processor 580 may include one or more processing units. Preferably, the processor 580 may integrate an application processor and a modem. The application processor mainly processes an operating system, a user interface, an application program, and the like. The modem mainly processes wireless communication. It may be understood that the foregoing modem may be not integrated into the processor 580.

The mobile phone 500 further includes the power supply 590 (such as a battery) for supplying power to the components. Preferably, the power supply may be logically connected to the processor 580 by using a power management system, thereby implementing functions such as charging, discharging and power consumption management by using the power management system.

Although not shown in the figure, the mobile phone 500 may further include a camera, a Bluetooth module, and the like, which are not further described herein.

In this embodiment of the present invention, the processor and the radio frequency (RF) circuit included in the user equipment have the following functions:

The RF circuit 510 is configured to obtain configuration information of at least one neighboring cell.

The processor 580 is configured to determine, according to configuration information of a serving cell and the configuration information of the at least one neighboring cell, that at least two cells of all cells including the serving cell and the at least one neighboring cell belong to an area of a same multimedia broadcast multicast service, and is further configured to: during measurement of a reference signal, combine reference signal measurement values of the at least two cells that belong to the same area to which the same multimedia broadcast multicast service belongs to, obtain a combined measurement value.

Alternatively, the processor 580 may also obtain a combined measurement value in a manner of combining reference signals and then performing measurement.

The processor 580 is further configured to determine, according to the combined measurement value, whether to perform cell reselection; or, trigger sending of a measurement report to a base station, and send a measurement report message to the base station, where the measurement report message includes the combined measurement value, so that the base station determines, according to combined measurement value, whether to perform a cell handover.

It should be noted that, after the UE obtains the combined measurement value, for UE in an unconnected state, the UE determines, according to the combined measurement value and a reference signal measurement value of another neighboring cell for which a measurement value combination operation is not performed, to perform a cell handover; and for UE in a connected state, the UE triggers a measurement report message, so that a measurement result is sent to a base station of the serving cell, and the base station determines whether a handover is needed.

According to the user equipment provided in this embodiment, the RF circuit obtains configuration information of at least one neighboring cell; the processor determines, according to configuration information of a serving cell and the configuration information of the at least one neighboring cell, that at least two cells of all cells including the serving cell and the at least one neighboring cell belong to a same area to which a same multimedia broadcast multicast service belongs; subsequently, during measurement of a reference signal, the processor combines reference signal measurement values of the at least two cells that belong to the same area to which the same multimedia broadcast multicast service belongs to, obtain a combined measurement value; or, combines reference signals of the at least two cells that belong to the same area to which the same multimedia broadcast multicast service belongs, and performs measurement to obtain a combined measurement value; and the processor determines, according to the combined measurement value, whether to perform cell reselection; or, triggers sending of a measurement report to a base station, and sends a measurement report message to the base station, where the measurement report message includes the combined measurement value, so that the base station determines, according to the combined measurement value, whether to perform a cell handover. Therefore, in a subsequent handover determining process, UE or a base station of a serving cell considers overall signal strength of an MBMS area, and radio signal quality of a single cell is prevented from being underestimated, so that an unnecessary handover procedure is avoided, and handover occasions become more appropriate, thereby ensuring quality of a radio signal obtained by UE.

Further, the RF circuit 510 is further configured to obtain unicast transmission indication information of a multimedia broadcast multicast service that the UE currently receives or prepares to receive.

The processor 580 is specifically configured to: if the combined measurement value meets a cell handover condition and a target cell is a unicast transmission cell, determine, according to the unicast transmission indication information, whether the multimedia broadcast multicast service that the UE currently receives or prepares to receive supports unicast transmission.

If the multimedia broadcast multicast service that the UE currently receives or prepares to receive supports unicast transmission, the processor 580 determines to perform a cell handover.

Alternatively, the foregoing unicast transmission indication information of a multimedia broadcast multicast service that the UE currently receives or prepares to receive may also be obtained by the base station. After the base station receives a measurement report message sent by the UE, if it is determined according to a measurement result included in the measurement report message that a cell handover condition is met and a target cell is a unicast transmission cell, in this case, the base station determines, according to the unicast transmission indication information of the service, whether the service supports unicast transmission. If the unicast transmission indication information indicates that the service supports unicast transmission, the base station instructs the UE to perform a cell handover.

It should be noted that for the foregoing two cases, if the unicast transmission indication information indicates that the service does not support unicast transmission, the UE does not select the target cell as a serving cell, and the base station does not instruct the UE to be handed over to the target cell.

Further, the processor 580 is specifically configured to compare a combined measurement value with a reference signal measurement value of at least one other cell, to determine whether to perform cell reselection; or the measurement report message further includes a reference signal measurement value of at least one other cell, so that the base station compares a combined measurement value with a reference signal measurement value of at least one other cell, to determine whether to perform a cell handover.

The other cell is a cell, which does not belong to an area to which any multimedia broadcast multicast service belongs, of all the cells including the serving cell and the at least one neighboring cell.

Further, the RF circuit 510 is specifically configured to receive a broadcast multicast signal measurement configuration message, sent by a source base station, of the at least one neighboring cell, where the broadcast multicast signal measurement configuration message of the neighboring cell includes the configuration information of the neighboring cell; or the RF circuit 510 is specifically configured to read a broadcast sent by a source base station, where the broadcast includes the configuration information of the neighboring cell.

Specifically, the configuration information of the neighboring cell specifically includes an area identifier corresponding to an area to which a multimedia broadcast multicast service of the neighboring cell belongs and frequency information of the neighboring cell, where the frequency information of the neighboring cell includes a frequency of the neighboring cell and/or identifier information of a frequency layer.

Further, the configuration information of the neighboring cell further includes threshold configuration information and/or identifier information of the neighboring cell.

Preferably, the configuration information of the serving cell includes a first identifier and frequency information of the serving cell, where the first identifier is an area identifier corresponding to an area to which the multimedia broadcast multicast service that the UE currently receives or prepares to receive belongs, and the frequency information of the serving cell includes a frequency of the serving cell and/or identifier information of a frequency layer.

The processor 580 is specifically configured to: if the first identifier is the same as the area identifier corresponding to the area to which the multimedia broadcast multicast service of the at least one neighboring cell belongs, and the frequency information of the serving cell is the same as the frequency information of the at least one neighboring cell, determine that the serving cell and the at least one neighboring cell belong to a same area to which a same multimedia broadcast multicast service belongs.

Further, the processor 580 is specifically configured to: during measurement of a reference signal, if the at least one neighboring cell includes the multimedia broadcast multicast service that the UE currently receives or prepares to receive, combine a reference signal measurement value of the serving cell and a reference signal measurement value of the at least one neighboring cell to obtain the combined measurement value.

Further, the processor 580 is specifically configured to: if areas to which multimedia broadcast multicast services of the at least two neighboring cells belong correspond to a same area identifier, and the at least two neighboring cells have same frequency information, determine that the at least two neighboring cells belong to the same area to which the same multimedia broadcast multicast service belongs.

Further, the processor 580 is specifically configured to: during measurement of a reference signal, if the at least two neighboring cells include the multimedia broadcast multicast service that the user equipment currently receives or prepares to receive, combine reference signal measurement values of the at least two neighboring cells to obtain the combined measurement value.

Further, in the foregoing embodiment, the area identifier corresponding to the area to which a multimedia broadcast multicast service of the neighboring cell belongs may be a single frequency network area identifier of the neighboring cell, and the first identifier is a single frequency network area identifier corresponding to the area to which the multimedia broadcast multicast service that the user equipment currently receives or prepares to receive belongs.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for ensuring continuous service reception in a wireless network, the method comprising:
   obtaining, by user equipment (UE), configuration information of at least one neighboring cell;
   determining, by the UE according to configuration information of a serving cell and the configuration information of the at least one neighboring cell, that at least two cells of all cells comprising the serving cell and the at least one neighboring cell belong to a same area to which a same multimedia broadcast multicast service belongs;
   during measurement of a reference signal, combining, by the UE, reference signal measurement values of the at least two cells that belong to the same area to which the same multimedia broadcast multicast service belongs to obtain a combined measurement value; and
   deciding, by the UE according to the combined measurement value, whether to perform cell reselection, or sending to a base station a measurement report message comprising the combined measurement value.

2. The method according to claim 1, further comprising:
   obtaining, by the UE, unicast transmission indication information of a multimedia broadcast multicast service that the UE currently receives or prepares to receive;
   when the combined measurement value meets a cell handover condition and a target cell is a unicast transmission cell, determining, by the UE according to the unicast transmission indication information, whether the multimedia broadcast multicast service that the UE currently receives or prepares to receive supports unicast transmission; and
   when the multimedia broadcast multicast service that the UE currently receives or prepares to receive supports unicast transmission, deciding, by the UE, to perform a cell handover.

3. The method according to claim 2, wherein:
   the UE compares the combined measurement value with a reference signal measurement value of at least one other cell, to determine whether to perform cell reselection; or
   the measurement report message further comprises a reference signal measurement value of at least one other cell, to enable the base station to compare the combined measurement value with the reference signal measurement value of the at least one other cell and to determine whether to perform a cell handover, wherein the other cell is a cell, which does not belong to an area to which any multimedia broadcast multicast service belongs, of all the cells comprising the serving cell and the at least one neighboring cell.

4. The method according to claim 1, wherein obtaining, by the UE, configuration information of at least one neighboring cell comprises:
   receiving, by the UE, a broadcast multicast signal measurement configuration message, sent by a source base station, of the at least one neighboring cell, wherein the broadcast multicast signal measurement configuration message of the neighboring cell comprises the configuration information of the neighboring cell; or
   reading, by the UE, a broadcast sent by a source base station, wherein the broadcast comprises the configuration information of the neighboring cell.

5. The method according to claim 4, wherein the configuration information of the neighboring cell comprises an area identifier corresponding to an area to which a multimedia broadcast multicast service of the neighboring cell belongs and frequency information of the neighboring cell, wherein the frequency information of the neighboring cell comprises a frequency of the neighboring cell and/or identifier information of a frequency layer.

6. The method according to claim 5, wherein the configuration information of the neighboring cell further comprises threshold configuration information and/or identifier information of the neighboring cell.

7. The method according to claim 1, wherein:
the configuration information of the serving cell comprises a first identifier and frequency information of the serving cell, wherein the first identifier is an area identifier corresponding to an area to which the multimedia broadcast multicast service that the user equipment currently receives or prepares to receive belongs, and the frequency information of the serving cell comprises a frequency of the serving cell and/or identifier information of a frequency layer; and
determining, by the UE according to configuration information of a serving cell and the configuration information of the at least one neighboring cell, that at least two cells of all cells comprising the serving cell and the at least one neighboring cell belong to a same area to which a same multimedia broadcast multicast service belongs comprises:
when the first identifier is the same as the area identifier corresponding to the area to which the multimedia broadcast multicast service of the at least one neighboring cell belongs, and the frequency information of the serving cell is the same as the frequency information of the at least one neighboring cell, determining, by the UE, that the serving cell and the at least one neighboring cell belong to the same area to which the same multimedia broadcast multicast service belongs.

8. The method according to claim 7, wherein combining, by the UE, reference signal measurement values of the at least two cells that belong to the same area to which the same multimedia broadcast multicast service belongs to obtain a combined measurement value comprises:
during measurement of a reference signal, when the at least one neighboring cell comprises the multimedia broadcast multicast service that the user equipment currently receives or prepares to receive, combining, by the UE, a reference signal measurement value of the serving cell and a reference signal measurement value of the at least one neighboring cell to obtain the combined measurement value.

9. The method according to claim 1, wherein determining, by the UE according to configuration information of a serving cell and the configuration information of the at least one neighboring cell, that at least two cells of all cells comprising the serving cell and the at least one neighboring cell belong to a same area to which a same multimedia broadcast multicast service belongs comprises:
when area identifiers corresponding to areas to which multimedia broadcast multicast services of the at least two neighboring cells belong are the same, and the at least two neighboring cells have same frequency information, determining, by the UE, that the at least two neighboring cells belong to the same area to which the same multimedia broadcast multicast service belongs.

10. The method according to claim 9, wherein combining, by the UE, reference signal measurement values of the at least two cells that belong to the same area to which the same multimedia broadcast multicast service belongs to obtain a combined measurement value comprises:
during measurement of a reference signal, when the at least two neighboring cells comprise the multimedia broadcast multicast service that the user equipment currently receives or prepares to receive, combining, by the UE, the reference signal measurement values of the at least two neighboring cells to obtain the combined measurement value.

11. User equipment, comprising:
a radio frequency circuit, configured to obtain configuration information of at least one neighboring cell; and
a processor, configured to:
determine, according to configuration information of a serving cell and the configuration information of the at least one neighboring cell, that at least two cells of all cells comprising the serving cell and the at least one neighboring cell belong to a same area to which a same multimedia broadcast multicast service belongs,
combine reference signal measurement values of the at least two cells that belong to the same area to which the same multimedia broadcast multicast service belongs to obtain a combined measurement value, and
determine, according to the combined measurement value, whether to perform cell reselection, or send to a base station a measurement report message comprising the combined measurement value.

12. The user equipment according to claim 11, wherein:
the radio frequency circuit is further configured to obtain unicast transmission indication information of a multimedia broadcast multicast service that the user equipment currently receives or prepares to receive; and
the processor is configured to:
when the combined measurement value meets a cell handover condition and a target cell is a unicast transmission cell, determine, according to the unicast transmission indication information, whether the multimedia broadcast multicast service that the user equipment currently receives or prepares to receive supports unicast transmission, and
when the multimedia broadcast multicast service that the user equipment currently receives or prepares to receive supports unicast transmission, determine to perform a cell handover.

13. The user equipment according to claim 11, wherein:
the processor is configured to compare the combined measurement value with a reference signal measurement value of at least one other cell, to determine whether to perform cell reselection; or
the measurement report message further comprises a reference signal measurement value of at least one other cell, to enable the base station to compare the combined measurement value with the reference signal measurement value of the at least one other cell and to determine whether to perform a cell handover, wherein the other cell is a cell, which does not belong to an area to which any multimedia broadcast multicast service belongs, of all the cells comprising the serving cell and the at least one neighboring cell.

14. The user equipment according to claim 11, wherein the radio frequency circuit is configured to:
receive a broadcast multicast signal measurement configuration message, sent by a source base station, of the at least one neighboring cell, wherein the broadcast multicast signal measurement configuration message of the neighboring cell comprises the configuration information of the neighboring cell; or
read a broadcast sent by a source base station, wherein the broadcast comprises the configuration information of the neighboring cell.

15. The user equipment according to claim 14, wherein the configuration information of the neighboring cell comprises an area identifier corresponding to an area to which a multimedia broadcast multicast service of the neighboring cell belongs and frequency information of the neighboring cell, wherein the frequency information of the neighboring cell comprises a frequency of the neighboring cell and/or identifier information of a frequency layer.

16. The user equipment according to claim 15, wherein the configuration information of the neighboring cell further comprises threshold configuration information and/or identifier information of the neighboring cell.

17. The user equipment according to claim 11, wherein:
the configuration information of the serving cell comprises a first identifier and frequency information of the serving cell, wherein the first identifier is an area identifier corresponding to an area to which the multimedia broadcast multicast service that the user equipment currently receives or prepares to receive belongs, and the frequency information of the serving cell comprises a frequency of the serving cell and/or identifier information of a frequency layer; and
the processor is configured to:
when the first identifier is the same as the area identifier corresponding to the area to which the multimedia broadcast multicast service of the at least one neighboring cell belongs, and the frequency information of the serving cell is the same as the frequency information of the at least one neighboring cell, determine that the serving cell and the at least one neighboring cell belong to the same area to which the same multimedia broadcast multicast service belongs.

18. The user equipment according to claim 17, wherein the processor is configured to:
during measurement of a reference signal, when the at least one neighboring cell comprises the multimedia broadcast multicast service that the user equipment currently receives or prepares to receive, combine a reference signal measurement value of the serving cell and a reference signal measurement value of the at least one neighboring cell to obtain the combined measurement value.

19. The user equipment according to claim 11, wherein the processor is configured to:
when area identifiers corresponding to areas to which multimedia broadcast multicast services of the at least two neighboring cells belong are the same, and the at least two neighboring cells have the same frequency information, determine that the at least two neighboring cells belong to the same area to which the same multimedia broadcast multicast service belongs.

20. The user equipment according to claim 19, wherein the processor is configured to:
during measurement of a reference signal, when the at least two neighboring cells comprise the multimedia broadcast multicast service that the user equipment currently receives or prepares to receive, combine the reference signal measurement values of the at least two neighboring cells to obtain the combined measurement value.

21. A method for ensuring continuous service reception in a wireless network, the method comprising:
obtaining, by user equipment (UE), configuration information of at least one neighboring cell;
determining, by the UE according to configuration information of a serving cell and the configuration information of the at least one neighboring cell, that at least two cells of all cells comprising the serving cell and the at least one neighboring cell belong to a same area to which a same multimedia broadcast multicast service belongs;
combining reference signals of the at least two cells that belong to the same area to which the same multimedia broadcast multicast service belongs, and performing measurement to obtain a combined measurement value; and
deciding, by the UE according to the combined measurement value, whether to perform cell reselection, or sending to a base station a measurement report message comprising the combined measurement value.

22. User equipment, comprising:
a radio frequency circuit, configured to obtain configuration information of at least one neighboring cell; and
a processor, configured to:
determine, according to configuration information of a serving cell and the configuration information of the at least one neighboring cell, that at least two cells of all cells comprising the serving cell and the at least one neighboring cell belong to a same area to which a same multimedia broadcast multicast service belongs,
combine reference signals of the at least two cells that belong to the same area to which the same multimedia broadcast multicast service belongs, and perform measurement to obtain a combined measurement value, and
determine, according to the combined measurement value, whether to perform cell reselection, or send to a base station a measurement report message comprising the combined measurement value.

* * * * *